(12) United States Patent
Fukuda

(10) Patent No.: US 9,710,538 B2
(45) Date of Patent: Jul. 18, 2017

(54) PROCESSING DEVICE, PROCESSING METHOD, PROGRAM, AND RECORDING MEDIUM

(71) Applicant: Rakuten, Inc., Shinagawa-ku, Tokyo (JP)

(72) Inventor: Takashi Fukuda, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 261 days.

(21) Appl. No.: 14/396,096

(22) PCT Filed: Apr. 5, 2013

(86) PCT No.: PCT/JP2013/060489
§ 371 (c)(1),
(2) Date: Oct. 22, 2014

(87) PCT Pub. No.: WO2014/017128
PCT Pub. Date: Jan. 30, 2014

(65) Prior Publication Data
US 2015/0081709 A1  Mar. 19, 2015

(30) Foreign Application Priority Data

Jul. 27, 2012 (JP) .................................. 2012-167781

(51) Int. Cl.
*G06F 17/30* (2006.01)
*G06Q 50/12* (2012.01)
*G06Q 90/00* (2006.01)
(52) U.S. Cl.
CPC ....... *G06F 17/30598* (2013.01); *G06Q 50/12* (2013.01); *G06Q 90/00* (2013.01)
(58) Field of Classification Search
None
See application file for complete search history.

(56) References Cited

U.S. PATENT DOCUMENTS

| 2004/0218806 | A1* | 11/2004 | Miyamoto ........... G06K 9/6253 382/145 |
| 2009/0077047 | A1* | 3/2009 | Cooper ................ G06F 17/2785 |
| 2010/0077001 | A1* | 3/2010 | Vogel ................ G06F 17/30707 707/777 |

FOREIGN PATENT DOCUMENTS

| JP | 2005-284406 A | 10/2005 |
| WO | 2013/015341 A1 | 1/2013 |

OTHER PUBLICATIONS

International Search Report for PCT/JP2013/060489 dated May 21, 2013.
Written Opinion for PCT/JP2013/060489 dated May 21, 2013.

* cited by examiner

*Primary Examiner* — Alex Gofman
*Assistant Examiner* — Umar Mian
(74) *Attorney, Agent, or Firm* — Sughrue Mion, PLLC

(57) ABSTRACT

An acquirer acquires, for the on-the path categories situated on the path from the topmost category of a hierarchical structure comprising categories into which products or serves are classified to each of a category of interest and the categories immediately below the category of interest, the frequencies of the names of the on-the-path categories and a keyword co-occurring in a search query given to a search device. An identifier identifies the category of interest as a category candidate immediately above a category of which the name is given by the keyword when the frequencies acquired for the on-the-path categories satisfy a candidate condition associated by the search device.

23 Claims, 25 Drawing Sheets

CATEGORY TABLE

| CATEGORY ID | CATEGORY NAME | CLASSIFICATION DATE/TIME | CLASSIFIED QUANTITY | SUCCESSFUL BIDS (SALES QUANTITY) | AVAILABILITY FOR EXHIBITION |
|---|---|---|---|---|---|
| J00001 | FASHION | 2011/06/20 19:55 | 20 | 120 | YES |
| J00002 | FOOD | 2011/06/20 18:55 | 21 | 130 | YES |
| ... | ... | ... | ... | ... | ... |
| J00011 | SHOES | 2011/06/20 18:56 | 120 | 120 | YES |
| J00012 | MEN'S FASHION | 2011/06/20 18:54 | 220 | 110 | YES |
| J00013 | LADIES' FASHION | 2011/06/20 18:55 | 90 | 130 | YES |
| ... | ... | ... | ... | ... | ... |
| J00021 | BEEF | 2011/06/20 17:55 | 131 | 120 | YES |
| J00022 | PORK | 2011/06/20 19:57 | 121 | 120 | YES |
| ... | ... | ... | ... | ... | ... |
| J00211 | LOIN | 2011/06/20 17:56 | 231 | 240 | YES |
| J00212 | ENTRAILS | 2011/06/20 17:58 | 102 | 230 | YES |
| J00219 | OTHERS | 2011/06/20 19:56 | 221 | 245 | YES |
| ... | ... | ... | ... | ... | ... |

FIG.7

CATEGORY HIERARCHY TABLE

| CATEGORY ID | CATEGORY NAME | IMMEDIATELY LOWER CATEGORY ID | IMMEDIATELY LOWER CATEGORY NAME |
|---|---|---|---|
| J00001 | FASHION | J00011 | SHOES |
| J00001 | FASHION | J00012 | MEN'S FASHION |
| J00001 | FASHION | J00013 | LADIES' FASHION |
| ... | ... | ... | ... |
| J00002 | FOOD | J00021 | BEEF |
| J00002 | FOOD | J00022 | PORK |
| ... | ... | ... | ... |
| J00021 | BEEF | J00211 | LOIN |
| J00021 | BEEF | J00212 | ENTRAILS |
| J00021 | BEEF | J00219 | OTHERS |
| ... | ... | ... | ... |

PRODUCT OR OTHER ITEMS TABLE

| PRODUCT OR OTHER ITEM ID | PRODUCT OR OTHER ITEM NAME | CLASSIFICATION CATEGORY ID | CLASSIFICATION CATEGORY NAME | BID PRICE | BIDDER ID | EXHIBITOR ID | EXHIBITION TIME LIMIT | ADVERTISEMENT FILE NAME | ADVERTISEMENT PAGE URL |
|---|---|---|---|---|---|---|---|---|---|
| M001 | XA BEAF | J00211 | LOIN | 3,000 | B001 | F101 | 2011/6/20 | M001.gif | ./public_dir/C001.html |
| M002 | XB BEAF | J00211 | LOIN | 4,000 | B002 | F102 | 2011/5/20 | M002.gif | ./public_dir/C002.html |
| M003 | XC BEAF | J00211 | LOIN | 3,500 | B003 | F103 | 2011/6/10 | M003.gif | ./public_dir/C003.html |
| M004 | XD BEAF | J00211 | LOIN | 1,000 | B004 | F104 | 2011/2/10 | M004.gif | ./public_dir/C004.html |
| M005 | XE BEAF | J00211 | LOIN | 1,100 | B004 | F104 | 2011/1/10 | M005.gif | ./public_dir/C005.html |
| M006 | XF BEAF | J00211 | LOIN | 1,200 | B004 | F104 | 2011/1/29 | M006.gif | ./public_dir/C006.html |
| ... | ... | ... | ... | ... | ... | ... | ... | ... | ... |
| M010 | YA PORK | J00022 | PORK | 800 | B001 | F103 | 2011/6/11 | M010.gif | ./public_dir/C010.html |
| ... | ... | ... | ... | ... | ... | ... | ... | ... | ... |
| M100 | ZA SANDALS | J00011 | SHOES | 5,000 | B011 | F111 | 2011/6/12 | M100.gif | ./public_dir/C100.html |
| M101 | ZB SKIRT | J00012 | LADIES' FASHION | 9,000 | B012 | F111 | 2011/6/12 | M101.gif | ./public_dir/C101.html |
| M102 | ZC SUITS | J00013 | MEN'S FASHION | 70,000 | B013 | F111 | 2011/6/12 | M102.gif | ./public_dir/C102.html |
| M103 | ZD SUITS | J00013 | MEN'S FASHION | 30,000 | B013 | F111 | 2011/6/12 | M103.gif | ./public_dir/C103.html |
| ... | ... | ... | ... | ... | ... | ... | ... | ... | ... |

FIG.10

PRODUCT OR OTHER ITEM KEYWORDS TABLE

| PRODUCT OR OTHER ITEM ID | PRODUCT OR OTHER ITEM NAME | KEYWORD |
|---|---|---|
| M001 | XA BEEF | FOR STEAK |
| M001 | XA BEEF | LOIN |
| M001 | XA BEEF | BEEF |
| M001 | XA BEEF | DOMESTIC |
| M002 | XB BEEF | FOR STEAK |
| M002 | XB BEEF | LOIN |
| M002 | XB BEEF | DOMESTIC |
| M002 | XB BEEF | BEEF |
| M003 | XC BEEF | FILLET |
| M003 | XC BEEF | DOMESTIC |
| M003 | XC BEEF | FOR STEAK |
| M003 | XC BEEF | BEEF |
| M004 | XD BEEF | LOIN |
| M004 | XD BEEF | FOR ROAST BEEF |
| M004 | XD BEEF | BEEF |
| M005 | XE BEEF | LOIN |
| M005 | XE BEEF | FOR ROAST BEEF |
| M005 | XE BEEF | BEEF |
| M006 | XF BEEF | LOIN |
| M006 | XF BEEF | FOR ROAST BEEF |
| M006 | XF BEEF | BEEF |
| ... | ... | ... |
| M010 | YA PORK | LOIN |
| M010 | YA PORK | FOR ROAST BEEF |
| M010 | YA PORK | PORK |
| ... | ... | ... |
| M100 | ZA SANDALS | FASHION |
| M100 | ZA SANDALS | SHOES |
| M101 | ZB SKIRT | FASHION |
| M101 | ZB SKIRT | LADIES' FASHION |
| M102 | ZC SUITS | FASHION |
| M102 | ZC SUITS | MEN'S FASHION |
| M103 | ZD SUITS | MEN'S FASHION |
| ... | ... | ... |

FIG.12

SEARCH COUNTS TABLE

| KEYWORD | SEARCH COUNT |
|---|---|
| TONGUE | 120 |
| LOIN | 160 |
| FOR STEAK | 340 |
| FOR ROAST BEEF | 320 |
| ENTRAILS | 60 |
| BEEF | 80 |
| FOOD | 240 |
| FASHION | 310 |
| SHOES | 150 |
| MEN'S SHOES | 80 |
| ... | ... |

ACQUISITION COUNTS TABLE

| FIRST KEYWORD \ SECOND KEYWORD | TONGUE | LOIN | FOR STEAK | FOR ROAST BEEF | ENTRAILS | BEEF | FOOD | FASHION | SHOES | MEN'S SHOES |
|---|---|---|---|---|---|---|---|---|---|---|
| TONGUE | | 28/6 | 20/10 | 42/110 | 18/4 | 2/40 | 1/36 | 4/3 | 3/2 | 2/2 |
| LOIN | | | 41/100 | 50/110 | 28/105 | 43/105 | 2/25 | 3/1 | 1/1 | 1/2 |
| FOR STEAK | | | | 108/120 | 34/105 | 47/120 | 2/23 | 2/1 | 1/2 | 0/1 |
| FOR ROAST BEEF | | | | | 36/105 | 46/110 | 2/27 | 2/2 | 2/1 | 1/2 |
| ENTRAILS | | | | | | 88/100 | 2/24 | 2/1 | 1/0 | 1/1 |
| BEEF | | | | | | | 1/30 | 3/2 | 2/2 | 0/1 |
| FOOD | | | | | | | | 3/3 | 1/1 | 2/1 |
| FASHION | | | | | | | | | 28/6 | 30/4 |
| SHOES | | | | | | | | | | 35/3 |
| MEN'S SHOES | | | | | | | | | | |

OR QUERY ACQUISITION COUNT / AND QUERY ACQUISITION COUNT

FIG.13

CO-OCCURRENCE FREQUENCIES TABLE

| | | SECOND KEYWORD | | | | | | | | |
|---|---|---|---|---|---|---|---|---|---|---|
| | | TONGUE | LOIN | FOR STEAK | FOR ROAST BEEF | ENTRAILS | BEEF | FOOD | FASHION | SHOES | MEN'S SHOES |
| FIRST KEYWORD | TONGUE | | 10/2 | 2/1 | 10/25 | 3/2 | 1/20 | 1/10 | 1/1 | 1/1 | 1/1 |
| | LOIN | | | 7/21 | 8/17 | 7/26 | 10/25 | 1/25 | 3/1 | 1/1 | 1/2 |
| | FOR STEAK | | | | 15/19 | 1/1 | 12/18 | 1/10 | 2/1 | 1/1 | 0/1 |
| | FOR ROAST BEEF | | | | | 36/25 | 46/28 | 2/5 | 1/2 | 1/1 | 1/2 |
| | ENTRAILS | | | | | | 88/63 | 2/8 | 2/1 | 1/0 | 1/1 |
| | BEEF | | | | | | | 1/30 | 3/2 | 2/2 | 0/1 |
| | FOOD | | | | | | | | 3/3 | 1/1 | 2/1 |
| | FASHION | | | | | | | | | 14/4 | 77/1 |
| | SHOES | | | | | | | | | | 15/1 |
| | MEN'S SHOES | | | | | | | | | | |

OR CO-OCCURRENCE FREQUENCY / AND CO-OCCURRENCE FREQUENCY

| ENTRY PAGE | | PI _ □ × |
|---|---|---|
| CATEGORY | SEARCH QUERY | |
| FOOD ▼ | FOR STEAK | SEARCH |

FIG.22

| | IMAGE | PRODUCT NAME | PRICE | STORE NAME |
|---|---|---|---|---|
| PR01 | XA Beef | XA BEEF | ¥3,000 | STORE S001 |
| PR02 | XA Beef | XB BEEF | ¥4,000 | STORE S002 |

SEARCH RESULTS PAGE

TOP > FOOD > BEEF > "FOR STEAK and LOIN" SEARCH RESULTS

SEARCH QUERY

FURTHER REFINING

PROCESSING DEVICE, PROCESSING METHOD, PROGRAM, AND RECORDING MEDIUM

CROSS REFERENCE TO RELATED APPLICATIONS

This application is a National Stage of International Application No. PCT/JP2013/060489 filed Apr. 5, 2013, claiming priority based on Japan Patent Application No. 2012-167781, filed Jul. 27, 2012, the contents of all of which are incorporated herein by reference in their entirety.

TECHNICAL FIELD

The present disclosure relates to a processing device, processing method, program, and recording medium, and particularly to processing of categories into which products or services are classified.

BACKGROUND ART

Traditionally, an element is classified by category at a web site presenting elements to the users. As a method of adding a new category, for example, Patent Literature 1 discloses a cooking recipe presentation system in which a category is divided to add a new category when the number of cooking recipes in the category reaches a given or higher value.

CITATION LIST

Patent Literature

Patent Literature 1: Unexamined Japanese Patent Application Kokai Publication No. 2005-284406.

SUMMARY OF INVENTION

Technical Problem

Here, the cooking recipe presentation system described in the Patent Literature 1 divides a category when the number of cooking recipes in the category is increased. Therefore, when multiple categories are presented in a hierarchical structure and one or more new categories are to be added regardless of increase in the number of cooking recipes, it is difficult to determine where in the hierarchical structure the new categories should be added. Furthermore, it is also difficult to determine whether an existing category is positioned properly.

The present disclosure is made in view of the above matters and an objective of the present disclosure is to provide a processing device, processing method, program, and recording medium capable of identifying a proper category position in a hierarchical structure having multiple categories.

Solution to Problem

In order to achieve the above objective, the processing device according to a first exemplary aspect of the present disclosure is a processing device of which processing objects are categories contained in a hierarchical structure comprising categories into which products or services are classified and a keyword, comprising:

an acquirer that acquires, for each category contained in the hierarchical structure, a frequency of the name of the category and the keyword co-occurring in a search query given to a search device; and an identifier that when at least a part of the distribution of the acquired frequencies in the hierarchical structure is in conformity with one of at least one predetermined distribution pattern, identifies the position in the hierarchical structure of a category of which the name is given by the keyword based on the conformed part in the hierarchical structure and the position pre-associated with the distribution pattern.

In the processing device according to the above aspect, one distribution pattern of the at least one distribution pattern is a distribution pattern in which some of frequencies are sufficiently different with reference to a given comparison criterion, and is pre-associated with the positions of the sufficiently different frequencies.

In the processing device according to the above aspect, one distribution pattern of the at least one distribution pattern is a distribution pattern in which frequencies are all sufficiently different from a frequency presenting the absence of co-occurrence with reference to a given comparison criterion, and is pre-associated with the position immediately below the frequency at the end in the sequence of the frequencies.

In the processing device according to the above aspect, given a first search query containing keywords, the search device searches for an object that is matched with all of the keywords, the acquirer acquires, for each category contained in the hierarchical structure, a first frequencies of the name of the category and the keywords co-occurring in the first search query given to the search device, when at least a part of the distribution of the acquired first frequencies in the hierarchical structure is in conformity with a first distribution pattern that is one of the at least one distribution pattern, the identifier identifies the position in the hierarchical structure of a category of which the name is given by the keyword based on the conformed part in the hierarchical structure and the position pre-associated with the first distribution pattern, and the first distribution pattern is a distribution pattern in which some of frequencies are sufficiently low with reference to a given comparison criterion, and is pre-associated with the positions of the sufficiently low frequencies.

In the processing device according to the above aspect, given a first search query containing keywords, the search device searches for an object that is matched with all of the keywords, the acquirer acquires, for each category contained in the hierarchical structure, a first frequencies of the name of the category and the keywords co-occurring in the first search query given to the search device, when at least a part of the distribution of the acquired first frequencies in the hierarchical structure is in conformity with a second distribution pattern of at least one distribution pattern, the identifier identifies the position in the hierarchical structure of a category of which the name is given by the keyword based on the conformed part in the hierarchical structure and the position pre-associated with the second distribution pattern, and the second distribution pattern is a distribution pattern in which frequencies are all sufficiently higher than a frequency presenting the absence of co-occurrence with reference to a given comparison criterion, and is pre-associated with the position immediately below the frequency at the end in the sequence of the frequencies.

In the processing device according to the above aspect, given a second query containing keywords, the search device searches for an object that is matched with any of the keywords, the acquirer acquires, for each category contained in the hierarchical structure, a second frequencies of the name of the category and the keywords co-occurring in the second search query given to the search device, when at least a part of the distribution of the acquired second frequencies in the hierarchical structure is in conformity with a third distribution pattern of at least one distribution pattern, the identifier identifies the position in the hierarchical structure of a category of which the name is given by the keyword based on the conformed part in the hierarchical structure and the position pre-associated with the third distribution pattern, and the third distribution pattern is a distribution pattern in which some of frequencies are sufficiently high with reference to a given comparison criterion, and is pre-associated with the positions of the immediately high frequencies.

In the processing device according to the above aspect, at least one distribution pattern is a second distribution pattern in which frequencies are all sufficiently higher than a frequency presenting the absence of co-occurrence with reference to a given comparison criterion, and is pre-associated with the position immediately below the frequency at the end in the sequence of the frequencies, and when a first part that is at least a part of the distribution of the acquired frequencies in the hierarchical structure is in conformity with the first distribution pattern and a second part that is at least a part of the distribution of the acquired frequencies in the hierarchical structure is in conformity with the second distribution pattern, the identifier identifies the position in the hierarchical structure of a category of which the name is given by the keyword based on the second part and the position pre-associated with the second distribution pattern.

The processing device according to the above aspect further comprises a creator creating a category of which the name is given by the keyword at the identified position.

In the processing device according to the above aspect, the keyword is the name of a category contained in the hierarchical structure, and further comprises a determiner determining whether the position in the hierarchical structure of a category of which the name is given by the keyword coincides with the identified position.

In the processing device according to the above aspect, the identifier sets a category contained in the hierarchical structure as a category of interest, identifies the path from the topmost category of the hierarchical structure to each of the category of interest and the categories immediately below the category of interest, and if the distribution of the acquired frequencies along the identified path is in conformity with the distribution pattern, identifies the position on the path that is pre-associated with the distribution pattern as the position of a category of which the name is given by the keyword.

The processing method according to a second aspect of the present disclosure is a method executed by a processing device of which processing objects are categories contained in a hierarchical structure comprising categories into which products or services are classified and a keyword, comprising:

an acquisition step in which an acquirer acquires, for each category contained in the hierarchical structure, the frequency of the name of the category and the keyword co-occurring in a search query given to a search device; and an identification step in which when at least a part of the distribution of the acquired frequencies in the hierarchical structure is in conformity with at least one predetermined distribution pattern, an identifier identifies the position in the hierarchical structure of a category of which the name is given by the keyword based on the conformed part in the hierarchical structure and the position pre-associated with the distribution pattern.

The program according to a third aspect of the present disclosure allows a computer of which processing objects are categories contained in a hierarchical structure comprising categories into which products or services are classified and a keyword to function as:

an acquirer that acquires, for each category contained in the hierarchical structure, the frequency of the name of the category and the keyword co-occurring in a search query given to a search device; and an identifier that when at least a part of the distribution of the acquired frequencies in the hierarchical structure is in conformity with at least one predetermined distribution pattern, identifies the position in the hierarchical structure of a category of which the name is given by the keyword based on the conformed part in the hierarchical structure and the position pre-associated with the distribution pattern.

The recording medium according to a fourth aspect of the present disclosure is a computer-readable recording medium on which programs are recorded that allow a computer of which processing objects are categories contained in a hierarchical structure comprising categories into which products or services are classified and a keyword to function as:

an acquirer that acquires, for each category contained in the hierarchical structure, the frequency of the name of the category and the keyword co-occurring in a search query given to a search device; and an identifier that when at least a part of the distribution of the acquired frequencies in the hierarchical structure is in conformity with at least one predetermined distribution pattern, identifies the position in the hierarchical structure of a category of which the name is given by the keyword based on the conformed part in the hierarchical structure and the position pre-associated with the distribution pattern.

Advantageous Effects of Invention

The present disclosure provides the capability of identifying a proper category position in a hierarchical structure having categories.

BRIEF DESCRIPTION OF DRAWINGS

FIG. 7 is an illustration presenting an example of the category table stored in the search device;

FIG. 8 is an illustration presenting an example of the category hierarchy table stored in the search device;

FIG. 9 is an illustration presenting an example of the products or other items table stored in the search device;

FIG. 10 is an illustration presenting an example of the product or other item keywords table stored in the search device;

FIG. 12 is an illustration presenting an example of the search counts table stored in the search device;

FIG. 13 is an illustration presenting an example of the acquisition counts table stored in the search device;

FIG. 14 is an illustration presenting an example of the co-occurrence frequencies table stored in the search device;

FIG. 15 is an illustration presenting an example of the entry page displayed by a bidder terminal device;

FIG. 22 is an illustration presenting an example of the search results page displayed by the bidder terminal device;

DESCRIPTION OF EMBODIMENTS

An embodiment of the present disclosure will be described hereafter with reference to the attached drawings.

Figure 1:
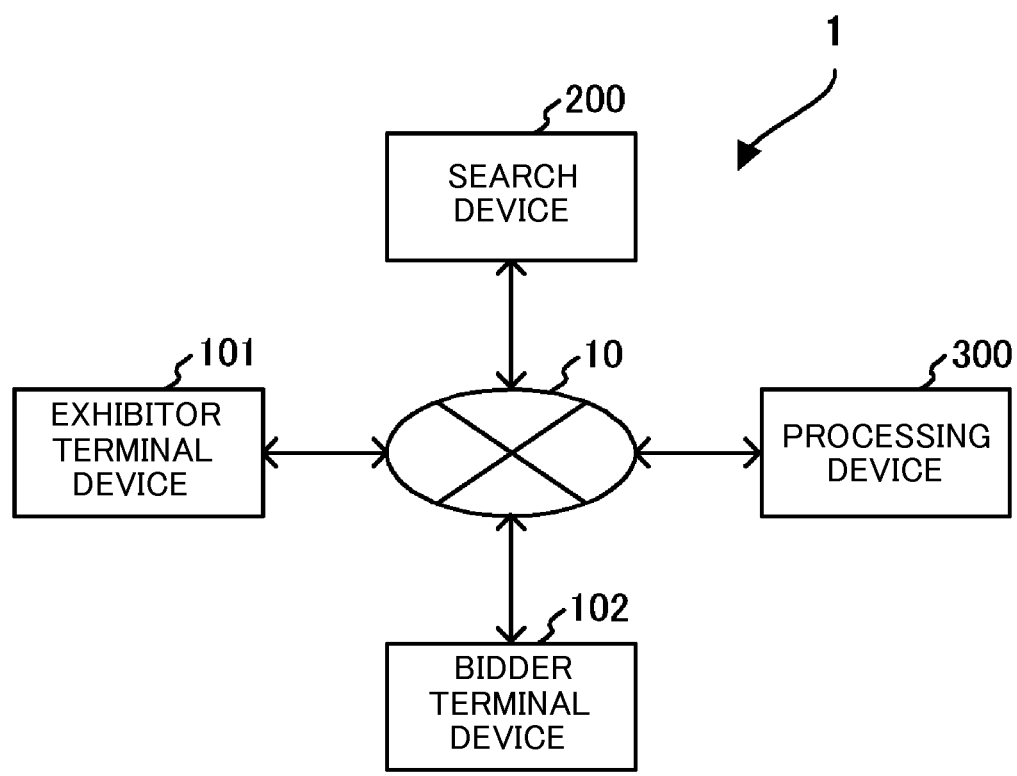
FIG. 1 is a system configuration diagram presenting an exemplary configuration of the category processing system constituted by the processing device according to an embodiment.

A processing device 300 according to an embodiment of the present disclosure constitutes a category processing system 1 as shown in FIG. 1. This embodiment will be described on the assumption that the category processing system 1 auctions products or services (products or other items hereafter) at an auction site. However, this is not restrictive. The category processing system 1 may sell or provide (sell or handle otherwise hereafter) at an electronic store opened on the Internet (namely an online store). Furthermore, the explanation will be made on the assumption that the services provided in this embodiment include video images distribution service through the Internet. However, this is not restrictive.

Figure 2:
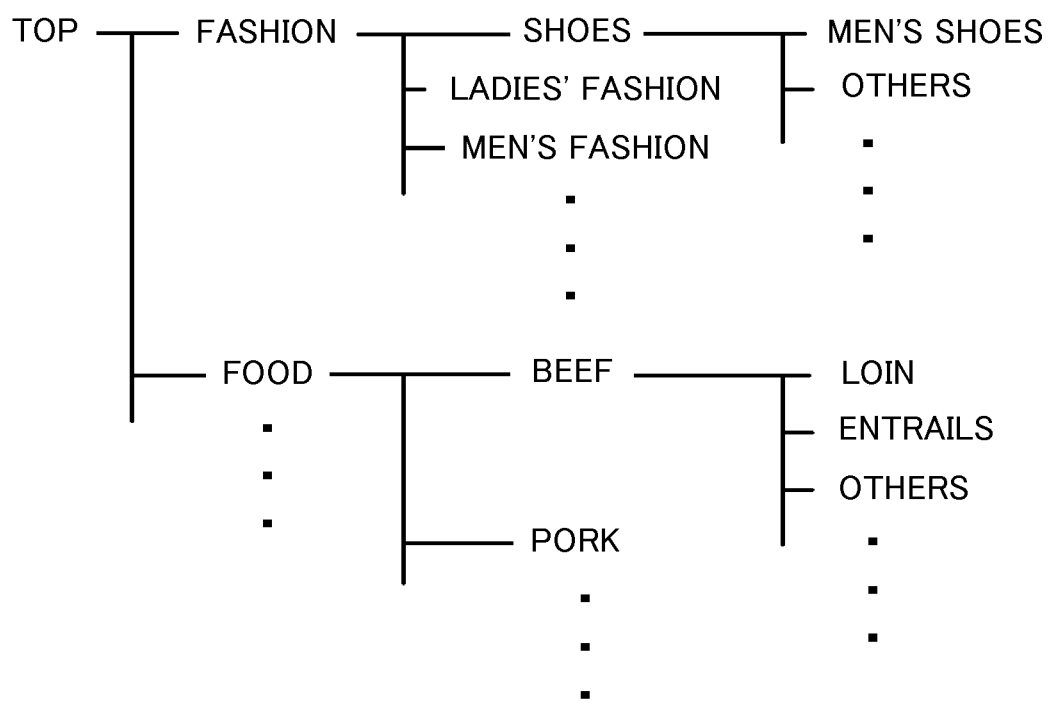
FIG. 2 is an illustration for explaining the category hierarchy of products or other items auctioned by the category processing system.

The products or other items exhibited at an auction by the category processing system 1 are classified into types (namely categories) as shown in FIG. 2 and the categories each belongs to a category hierarchy forming a hierarchical structure.

Here, the category hierarchy in this embodiment is presented by a tree structure having nodes associated with the categories. In the following explanation, "the topmost category" corresponds to the root node of the tree structure and corresponds to "TOP" of the category hierarchy shown in FIG. 2.

Furthermore, "an immediately upper category" corresponds to a parent node in the tree structure. For example, in the category hierarchy shown in FIG. 2, the immediately upper category of a category "SHOES" is a category "FASHION."

Furthermore, "an immediately lower category" corresponds to a child node in the tree structure. For example, in the category hierarchy shown in FIG. 2, the immediately lower categories of a category "FOOD" are categories "BEEF" and "PORK."

Furthermore, "an upper-level category" corresponds to an ancestral node in the tree structure. For example, in the category hierarchy shown in FIG. 2, the upper-level categories of a category "MEN'S SHOES" are categories "SHOES," "FASHION," and "TOP."

Furthermore, "a lower-level category" corresponds to a descendant node in the tree structure. For example, in the category hierarchy shown in FIG. 2, the lower-level categories of a category "FASHION" are categories "SHOES," "LADIES' FASHION," "MEN'S FASHION," and "MEN'S SHOES."

Furthermore, "a sibling category" corresponds to a sibling node in the tree structure. For example, in the category hierarchy shown in FIG. 2, the sibling categories of a category "SHOES" are the categories immediately below the category "FASHION such as the categories "LADIES' FASHION" and "MEN'S FASHION."

Furthermore, "an end category" corresponds to a leaf node in the tree structure. For example, in the category hierarchy shown in FIG. 2, the end nodes are the categories immediately below which there is no category such as categories "MEN'S SHOES," "LOIN," and "ENTRAILS."

The category processing system 1 auctioning the products or other items classified into the above categories comprises, in addition to the processing device 300, a computer communication network 10 (simply the communication network 10 hereafter), an exhibitor terminal 101, a bidder terminal 102, and a search device 200 as shown in FIG. 1.

The communication network 10 comprises, for example, the Internet. The communication network 10 can be a LAN (Local Area Network) or a public line network.

The exhibitor terminal device 101 and bidder terminal device 102 comprise, for example, a personal computer comprising a display such as an LCD (Liquid Crystal Display) and an inputter such as a keyboard and mouse.

Figure 3:
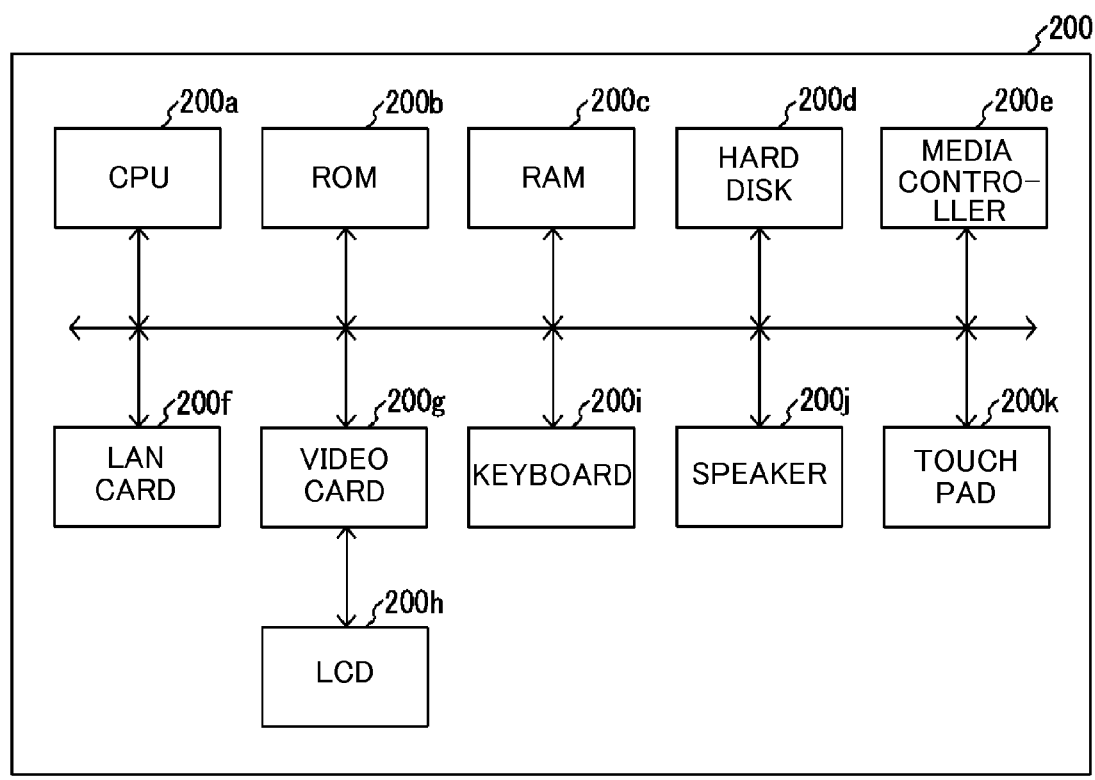
FIG. 3 is a hardware configuration diagram presenting an exemplary configuration of the search device according to the embodiment.

The search device 200 comprises a server unit as shown in FIG. 3, comprising a CPU (Central Processing Unit) 200a, a ROM (Read Only Memory) 200b, a RAM (Random Access Memory) 200c, a hard disk 200d, a media controller 200e, a LAN card 200f, a video card 200g, an LCD 200h, a keyboard 200i, a speaker 200j, and a touch pad 200k.

The CPU 200a executes software procedures according to programs saved in the ROM 200b or hard disc 200d to control the entire search device 200. The RAM 200c temporarily stores information (namely data) to process while the CPU 200a executes the programs.

The hard disk 200d is an information storage storing a list (namely a table) in which various kinds of information (namely data) is saved. Incidentally, the search device 200 can comprise a flash memory in place of the hard disk 200*d*.

The media controller 200*e* reads various data and programs from a recording medium including a flash memory, CD (compact disc), DVD (digital versatile disc), and Blu-ray (registered trademark) disc.

The LAN card 200*f* transmits/receives data to/from the exhibitor terminal device 101, bidder terminal device 102, and processing device 300 connected via the communication network 10. The keyboard 200*i* and touch pad 200*k* enter signals or information according to user operation. The LAN card 200*f* constitutes an acquirer 220 and presenter 240 shown in FIG. 6.

The video card 200*g* draws (namely renders) an image based on digital signals output from the CPU 200*a* and outputs image signals presenting the drawn image. The LCD 200*h* displays the image according to the image signals output from the video card 200*g*. Incidentally, the search device 200 can comprise a PDP (Plasma Display Panel) or EL (Electroluminescence) display in place of the LCD 200*h*. The speaker 200*j* outputs sound based on signals output from the CPU 200*a*.

Figure 4:
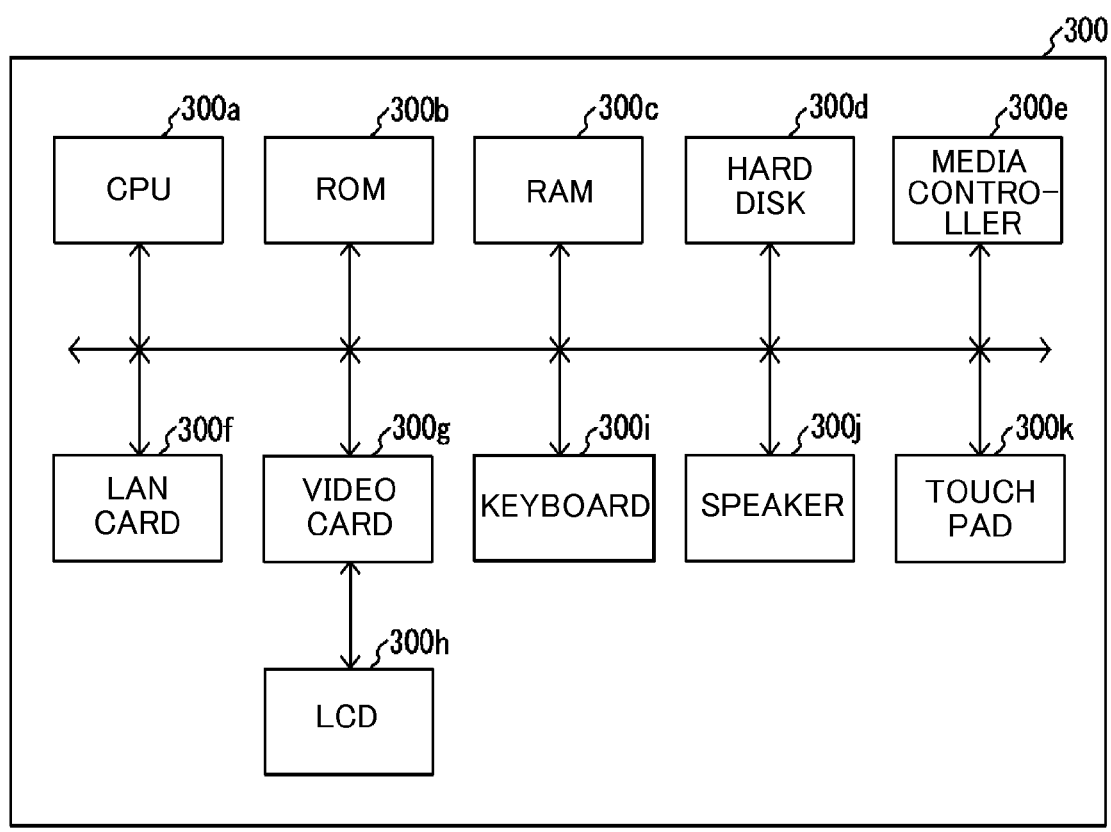
FIG. 4 is a hardware configuration diagram presenting an exemplary configuration of the processing device according to the embodiment.

The processing device 300 comprises a server unit as shown in FIG. 4, comprising a CPU 300*a*, a ROM 300*b*, a RAM 300*c*, a hard disk 300*d*, a media controller 300*e*, a LAN card 300*f*, a video card 300*g*, an LCD 300*h*, a keyboard 300*i*, a speaker 300*j*, and a touch pad 300*k*.

The CPU 300*a* executes software procedures according to programs saved in the ROM 300*b* or hard disk 300*d* to control the entire processing device 300. The RAM 300*c* temporarily stores information (namely data) to process while the CPU 300*a* executes the programs.

The hard disk 300*d* is an information storage storing a list (namely a table) in which various kinds of information (namely data) is saved. Incidentally, the processing device 300 can comprise a flash memory in place of the hard disk 300*d*.

The media controller 300*e* reads various data and programs from a recording medium including a flash memory, CD, DVD, and Blu-ray (registered trademark) disc.

The LAN card 300*f* transmits/receives data to/from the exhibitor terminal device 101, bidder terminal device 102, and search device 200 connected via the communication network 10. The keyboard 300*i* and touch pad 300*k* enter signals or information according to user operation.

The video card 300*g* draws (namely renders) an image based on digital signals output from the CPU 300*a* and outputs an image according to image signals presenting the drawn image. The LCD 300*h* displays the image according to the image signals output from the video card 300*g*. Incidentally, the processing device 300 can comprise a PDP or EL display in place of the LCD 300*h*. The speaker 300*j* outputs sound based on signals output from the CPU 300*a*.

Classification of a product or other item will be described hereafter.

With the inputter being operated by the exhibitor of a product or other item, the exhibitor terminal device 101 enters information presenting the name of the product or other item (the product or other item name hereafter), information identifying a category specified by the exhibitor (a classification category hereafter) as the lowest-level category into which the product or other item is classified (a classification category ID hereafter), advertisement information advertising the product or other item, and information presenting the exhibition time limit of the product or other item. Subsequently, the exhibitor terminal device 101 sends the entered information presenting the product or other item name, classification category ID, advertisement information, and information presenting the exhibition time limit to the search device 200.

Figure 5:
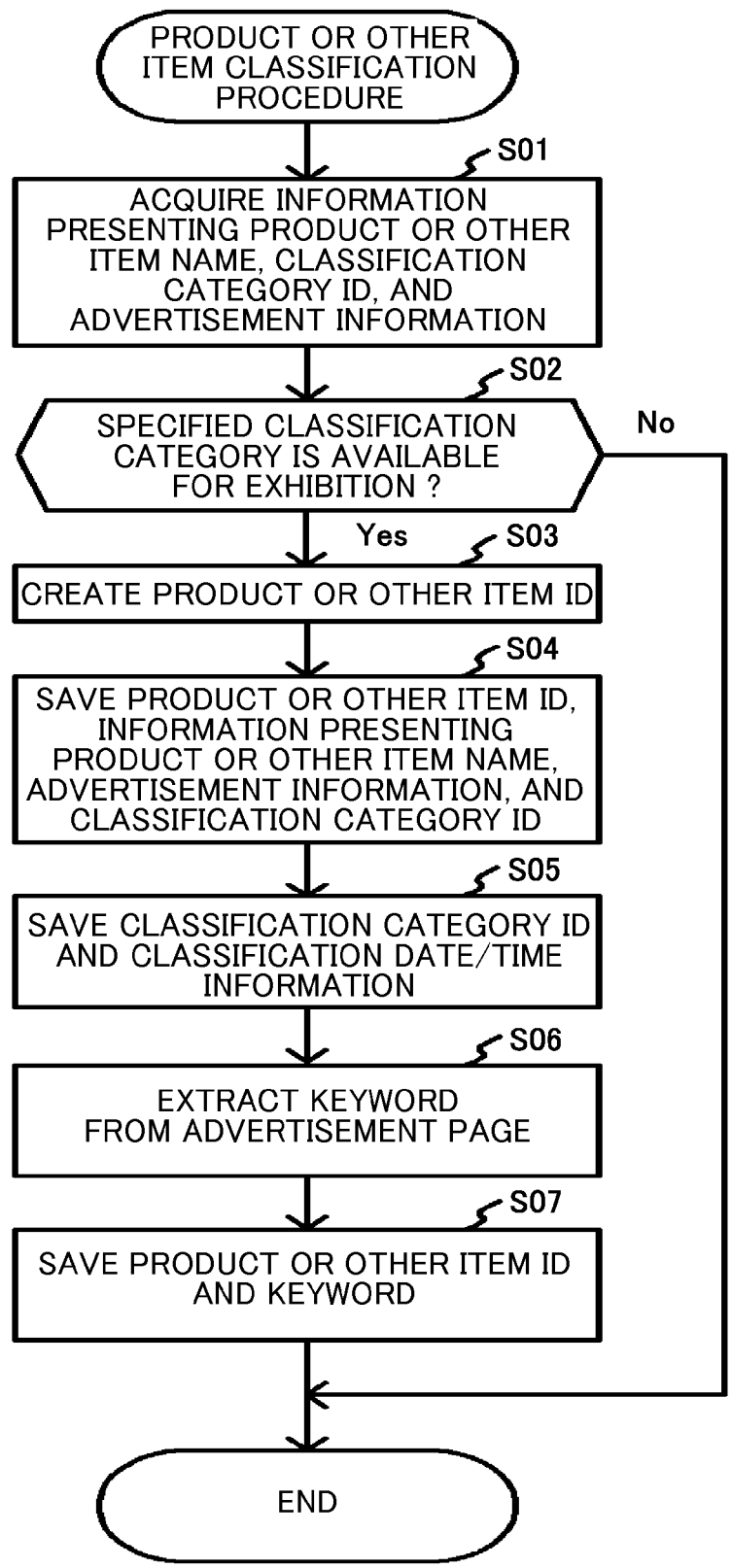
FIG. 5 is a flowchart presenting an example of the product or other item classification procedure executed by the search device.
Figure 6:
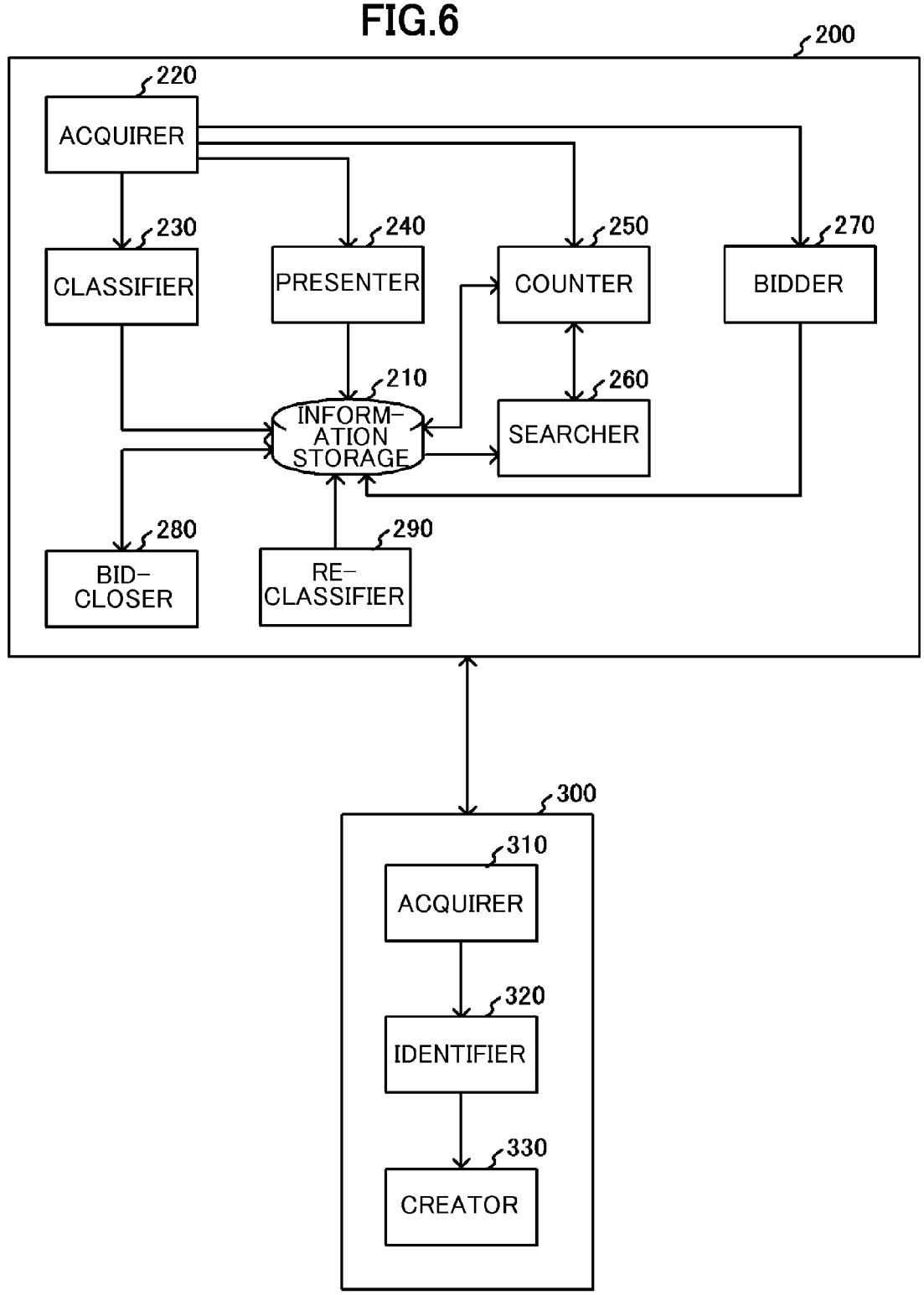
FIG. 6 is a functional block diagram presenting an exemplary function of the search device and processing device.

As the LAN card 200*f* of the search device 200 shown in FIG. 3 receives the information presenting the product or other item name from the exhibitor terminal device 101, the CPU 200*a* executes the product or other item classification procedure as shown in FIG. 5 to classify the product or other item of which the name is presented by the received information into the category identified by the classification category ID. Thus, the CPU 200*a* of the search device 200 functions as a classifier 230 as shown in FIG. 6. Furthermore, the CPU 200*a* cooperates with the hard disc 200*d* to function as an information storage 210. Furthermore, the CPU 200*a* cooperates with the LAN card 200*f* to function as an acquirer 220.

Here, prior to explanation of the product or other item classification procedure in FIG. 5, data used in executing the procedure will be described.

The information storage 210 in FIG. 6 stores a category table as shown in FIG. 7. The category table saves information associating information identifying a category as shown in FIG. 2 (a category ID hereafter), information presenting the name of the category (a category name hereafter), information presenting the date/time when the product or other item is last classified into the category (classification date/time hereafter), the number of products or other items classified into the category (a classified quantity hereafter), information presenting the number of times the bid for a product or other item classified into the category is successfully closed (namely sold) (a sales quantity hereafter), and a flag presenting whether a product or other item classified into the category is allowed to be exhibited (the exhibition availability flag hereafter).

The information storage 210 further stores a category hierarchy table as shown in FIG. 8. The category hierarchy table saves information associating the category ID and category name information saved in the category table in FIG. 7, the category ID of a category immediately below the category identified by the category ID (an immediately lower category ID hereafter), and information presenting the name of the immediately lower category (an immediately lower category name hereafter).

The information storage 210 further stores a products or other items table as shown in FIG. 9. The products or other items table saves information associating information identifying a product or other item (a product or other item ID hereafter), information presenting the name of the product or other item, a classification category ID identifying the classification category of the product or other item, information presenting the name of the classification category (a classification category name hereafter), auction information regarding auction of the product or other item, and advertisement information advertising the product or other item.

Incidentally, the auction information is information associating information presenting the highest bid price of the product or other item, information identifying the bidder who has bid the product or other item with that bid price (a bidder ID hereafter), information identifying the exhibitor exhibiting the product or other item (an exhibitor ID hereafter), and information presenting the exhibition time limit. Furthermore, the advertisement information is information associating information presenting the name of an image file presenting advertisement of the product or other item (an advertisement file name hereafter) and information presenting the URL of an advertisement page (an advertisement page URL hereafter).

The information storage 210 further stores a product or other item keywords table as shown in FIG. 10. The product or other item keywords table saves information associating a product or other item ID identifying a product or other item, information presenting the product or other item name of the product or other item, and information presenting a keyword describing the product or other item.

Incidentally, the information presenting a keyword associated with a product or other item ID in the product or other item keywords table in FIG. 10 can be information presenting a keyword extracted from a character string presented in an advertisement image saved in an advertisement file of the product or other item identified by the product or other item ID (namely a keyword extracted from the detailed advertisement content) or information presenting a keyword selected by the exhibitor of the product or other item identified by the product or other item ID.

Description of the product or other item classification procedure executed using the above data will be resumed hereafter.

As execution of the product or other item classification procedure in FIG. 5 starts, the acquirer 220 in FIG. 6 acquires from the LAN card 200f in FIG. 3 information presenting a product or other item name, a classification category ID, and advertisement information that are received from the exhibitor terminal device 101 (Step S01).

Then, the classifier 230 in FIG. 6 makes reference to the exhibition availability flag associated with the same category ID as the classification category ID acquired in the Step S01 in the category table in FIG. 7, and determines whether the specified classification category is available for exhibition (Step S02). At this point, if it is determined that the specified classification category is not available for exhibition (Step S02; No), the classifier 230 ends the execution of the product or other item classification procedure.

On the other hand, if it is determined that the specified classification category is available for exhibition (Step S02; Yes), the classifier 230 creates a product or other item ID for the product or other item to exhibit (Step S03). Then, the classifier 230 saves in the products or other items table in FIG. 9 information associating the product or other item ID created in the Step S03 and the information presenting a product or other item name, classification category ID, information presenting the classification category name, and advertisement information that are acquired in the Step S01 (Step S04).

Then, the classifier 230 acquires the system date/time managed by the OS (operating system) and sets the acquired system date/time as the classification date/time when a product or other item is last classified into the classification category. Then, the classifier 230 saves in the category table in FIG. 7 information associating the classification category ID and information presenting the classification date/time (Step S05).

Then, the classifier 230 extracts a keyword from an advertisement page located at the URL presented by the advertisement information acquired in the Step S01 (Step S06). The classifier 230 extracts as a keyword a word that is used in the advertisement page more times than a given number of times set for extracting a keyword. However, the classifier 230 can extract as a keyword a word that is used in the advertisement page less times than the given number of times. Incidentally, information presenting a given number of times set for extracting a keyword is stored in the information storage 210.

Subsequently, the classifier 230 saves in the product or other item keywords table in FIG. 10 information associating one or multiple keywords extracted and the product or other item ID created in the Step S03 (Step S07), and ends the execution of the product or other item classification procedure.

Search queries used in searching a product or other item to bit will be described hereafter.

With the inputter being operated by the user who intends to bid an exhibited product or other item, the bidder terminal device 102 in FIG. 1 enters various kinds of information such as a search query and sends the entered information to the search device 200. Furthermore, the bidder terminal device 102 receives information sent from the search device 200 and displays the received information on the display.

This embodiment will be described on the assumption that the entered search query is any of the following: a search query comprising a single keyword describing a product or other item, a search query comprising a single keyword and a refining order, a search query comprising keywords and Boolean search operators concatenating the keywords, and a search query comprising keywords (namely containing keywords but not containing operators), but this is not restrictive.

The query comprising a single keyword is a query ordering the search device 200 to return the results of searching for a product or other item described by the keyword in the products or other items exhibited at the auction. The search query comprising a single keyword and a refining order is a query giving an order to refine based on the search query sent the previous time (namely the search results), based on the product or other item further described by the keyword the products or other items found.

The explanation is made on the assumption that the Boolean search operators include operators AND, OR, and-, but this is not restrictive. The search query comprising keywords and Boolean search operators concatenating the keywords includes, for example, queries presented by the following expressions (1) to (3)

First keyword AND Second keyword . . . (1)
First keyword OR Second keyword . . . (2)
First keyword-Second keyword . . . (3)

The search query presented by the expression (1) is a query giving an order to return the results of searching for products or other items described by the first keyword and described by the second keyword as well. In other words, the search query presented by the expression (1) is a query giving an order to return the results of further refining the products or other items described by the first keyword to the products or other items described by the second keyword as well or further refining the products or other items described by the second keyword to the products or other items described by the first keyword as well.

The search query presented by the expression (2) is a query giving an order to return the results of searching for products or other items described by one of the first keyword and second keyword. In other words, the search query presented by the expression (2) is a query giving an order to return the results of searching both for products or other items described by the first keyword and for products or other items described by the second keyword.

The search query presented by the expression (3) is a query giving an order to return the results of searching for products or other items described by the first keyword but not described by the second keyword. In other words, the search query presented by the expression (3) is a query giving an order to return the results of searching for products or other items described by the first keyword from which products or other items described by the second keywords are excluded.

Here, the frequency of a first keyword and a second keyword co-occurring in a search query is termed the co-occurrence frequency. The frequency of a first keyword and a second keyword co-occurring in a search query in which they are concatenated by the operator AND is termed the AND co-occurrence frequency. More specifically, the AND co-occurrence frequency is acquired as the ratio of the acquisition count of a search query in which a first keyword and a second keyword are concatenated by the operator AND to the sum of the acquisition count of a search query containing the first keyword and the acquisition count of a search query containing the second keyword.

Furthermore, the frequency of a first keyword and a second keyword co-occurring in a search query in which they are concatenated by the operator OR is termed the OR co-occurrence frequency. More specifically, the OR co-occurrence frequency is acquired as the ratio of the acquisition count of a search query in which a first keyword and a second keyword are concatenated by the operator OR to the sum of the acquisition count of a search query containing the first keyword and the acquisition count of a search query containing the second keyword.

Bidding of a product or other item will be described hereafter.

Figure 11:
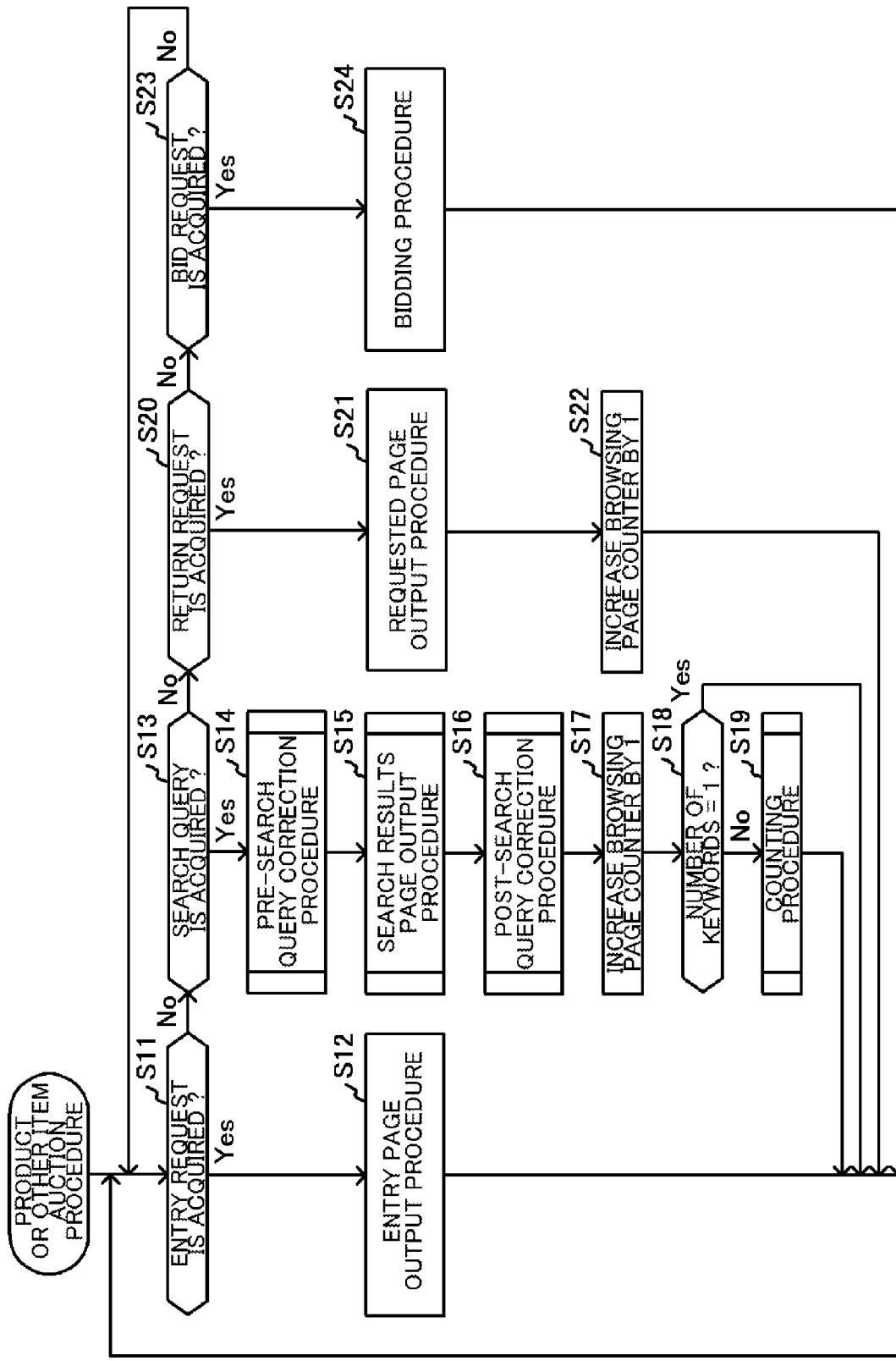
FIG. 11 is a flowchart presenting an example of the product or other item auction procedure executed by the search device.

As the LAN card 200f receives information such as a search query from the bidder terminal device 102, the CPU 200a of the search device 200 shown in FIG. 3 executes the product or other item auction procedure as shown in FIG. 11 to auction a product or other item searched for based on the search query. Thus, the CPU 200a functions as a counter 250, a searcher 260, and a bidder 270 as shown in FIG. 6. Furthermore, the CPU 200a cooperates with the LAN card 200f to function as a presenter 240.

Here, prior to explanation of the product or other item auction procedure in FIG. 11, data used in executing the procedure will be described.

The information storage 210 stores a search counts table as shown in FIG. 12. The search counts table saves information associating information presenting a keyword used in searching for a product or other item and information presenting the number of times search for a product or other item using the keyword is conducted (the search count hereafter).

The information storage 210 further stores an acquisition counts table as shown in FIG. 13, The acquisition counts table saves information associating information presenting a word specified as a first keyword, information presenting a word specified as a second keyword, information presenting the AND query acquisition count that is the acquisition count of a search query comprising the first keyword and second keyword concatenated by the operator AND, and information presenting the OR query acquisition count that is the acquisition count of a search query comprising the first keyword and second keyword concatenated by the operator OR.

The information storage 210 further stores a co-occurrence frequencies table as shown in FIG. 14. The co-occurrence frequencies table saves information associating information presenting a word specified as a first keywords, information presenting a word specified as a second keyword, and information presenting the AND co-occurrence frequency and OR co-occurrence frequency of the first keyword and second keyword.

The product or other item auction procedure executed using the above data will be described hereafter using a case in which the processing device acquires a search query comprising a single keyword two times in a given time period by way of example.

As the LAN card 200f of the search device 200 shown in FIG. 3 receives from the bidder terminal device 102 an entry request requesting return of an entry page used for entering a search query, the CPU 200a starts executing the product or other item auction procedure shown in FIG. 11.

As execution of the product or other item auction procedure in FIG. 11 starts, the acquirer 220 in FIG. 6 acquires from the LAN card 200f in FIG. 3 information received from the bidder terminal device 102. Then, if the acquirer 220 determines that the entry request is acquired from the bidder terminal device 102 (Step S11; Yes), the presenter 240 in FIG. 6 acquires from the information storage 210 information presenting an entry page PI used for entering a search query as shown in FIG. 15, and outputs the acquired information to the LAN card 200f in FIG. 3 (Step S12). Subsequently, the LAN card 200f sends the output information to the bidder terminal device 102.

Receiving the information presenting the entry page PI, the bidder terminal device 102 displays the entry page PI presented by the received information on the display. Then, operated by the user who has viewed the entry page, the bidder terminal device 102 enters through the inputter a search query "FOR STEAK" specified by the user and a category ID "J00002" of a category "FOOD" specified as the category to which the product or other item to be searched for using the query belongs, and sends the entered search query "FOR STEAK" and category ID "J00002" to the search device 200. Incidentally, the entered search query and category ID are not limited to the above.

After the Step S12 in FIG. 11, as the LAN card 200f of the search device 200 shown in FIG. 3 receives the search query "FOR STEAK" and category ID "J00002" from the bidder terminal device 102, the acquirer 220 in FIG. 6 acquires the search query "FOR STEAK" and category ID "J00002 " from the LAN card 200f. Subsequently, if it is determined that the acquirer 220 has received from the bidder terminal device 102 not an entry request (Step S11; No) but a search query (Step S13; Yes), the pre-search query correction procedure as shown in FIG. 16 is executed (Step S14).

Figure 16:
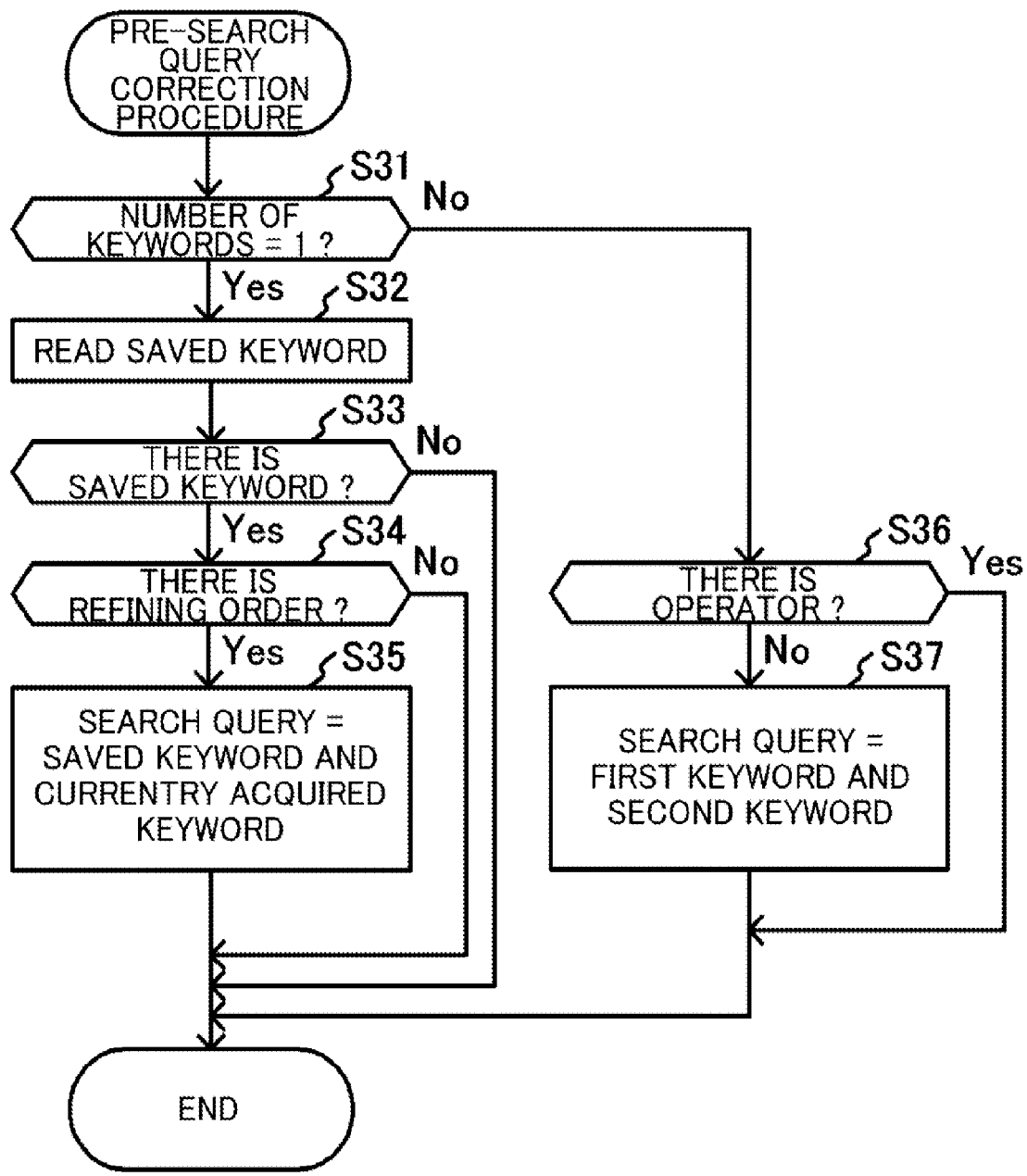
FIG. 16 is a flowchart presenting an example of the pre-search query correction procedure executed by the search device.

As the pre-search query correction procedure in FIG. 16 starts, the counter 250 in FIG. 6 determines that the search query contains a single keyword "FOR STEAK" (Step S31; Yes), and reads information presenting a keyword that is saved in the information storage 210 (a saved keyword hereafter) in Step S77 of FIG. 19 described later (Step S32). At this point, since the processing of Step S77 in FIG. 19 has not been executed yet, the counter 250 determines that no information presenting a saved keyword is stored in the information storage 210 (Step S33; No), and ends the execution of the pre-search query correction procedure.

Figure 17:
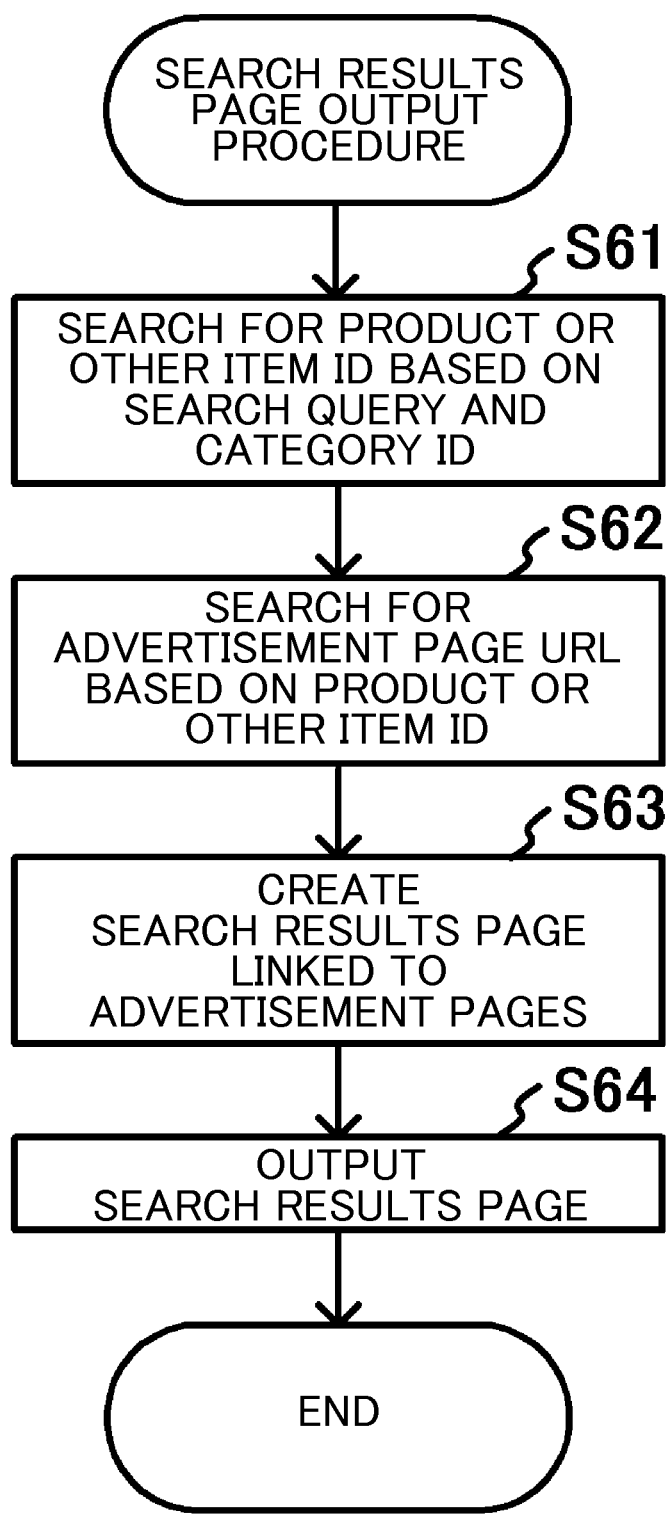
FIG. 17 is a flowchart presenting an example of the search results page output procedure executed by the search device.

After the Step S14 in FIG. 11, the search results page output procedure as shown in FIG. 17 is executed (Step S15).

As the search results page output procedure in FIG. 17 starts, the searcher 260 in FIG. 6 searches the category hierarchy table in FIG. 8 for immediately lower category IDs "J00021" and "J00002" associated with the acquired category ID "J00002." The searcher 260 further searches for immediately lower category IDs "J00211," "J00212," and "J00219" associated with the same category ID as the immediately lower category ID "J00021." Then, the searcher 260 acquires the system date/time from the OS and searches the products or other items table in FIG. 9 for product or other item IDs "M001" to "M006" and "M010" associated with the same classification category ID as any of the acquired category ID "J00002" and immediately lower category IDs "J00021," "J00002," and "J00219" and information presenting the exhibition limit time later than the system date/time.

Subsequently, the searcher 260 searches the product or other item keywords table in FIG. 10 for product or other item IDs "M001" to "M003" associated with information presenting the same keyword as the acquired search query "FOR STEAK" among the acquired product IDs "M001" to "M006" and "M010" (Step S61).

Then, the searcher 260 searches the products or other items table in FIG. 9 based on the product or other item IDs "M001" to "M003" found in the Step S61 for information presenting advertisement file names advertising the products or other items identified by those IDs, information presenting the advertisement page URLs, and information presenting the product or other item names (Step S62). Through this processing, the searcher 260 acquires information presenting a product or other item name "XA BEEF," information presenting "XB BEEF," information presenting "XC BEEF," and so on.

Figure 18:
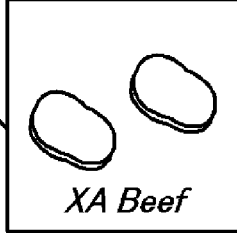
FIG. 18 is an illustration presenting an example of the search results page displayed by the bidder terminal device.

Then, the presenter 240 creates a search results page PC1 as shown in FIG. 18 (Step S63). The search results page PC1 posts advertisement images PRO1 to PRO3 presented by electronic files having the advertisement file names presented by information acquired in the Step S62 in FIG. 17, and the posted advertisement images are linked to advertisement pages advertising the products or other items that are advertised in the advertisement images. Subsequently, the presenter 240 outputs information presenting the created search results page PC1 to the LAN card 200f in FIG. 3 (Step S64). The LAN card 200f sends the output information to the bidder terminal device 102.

Figure 19:
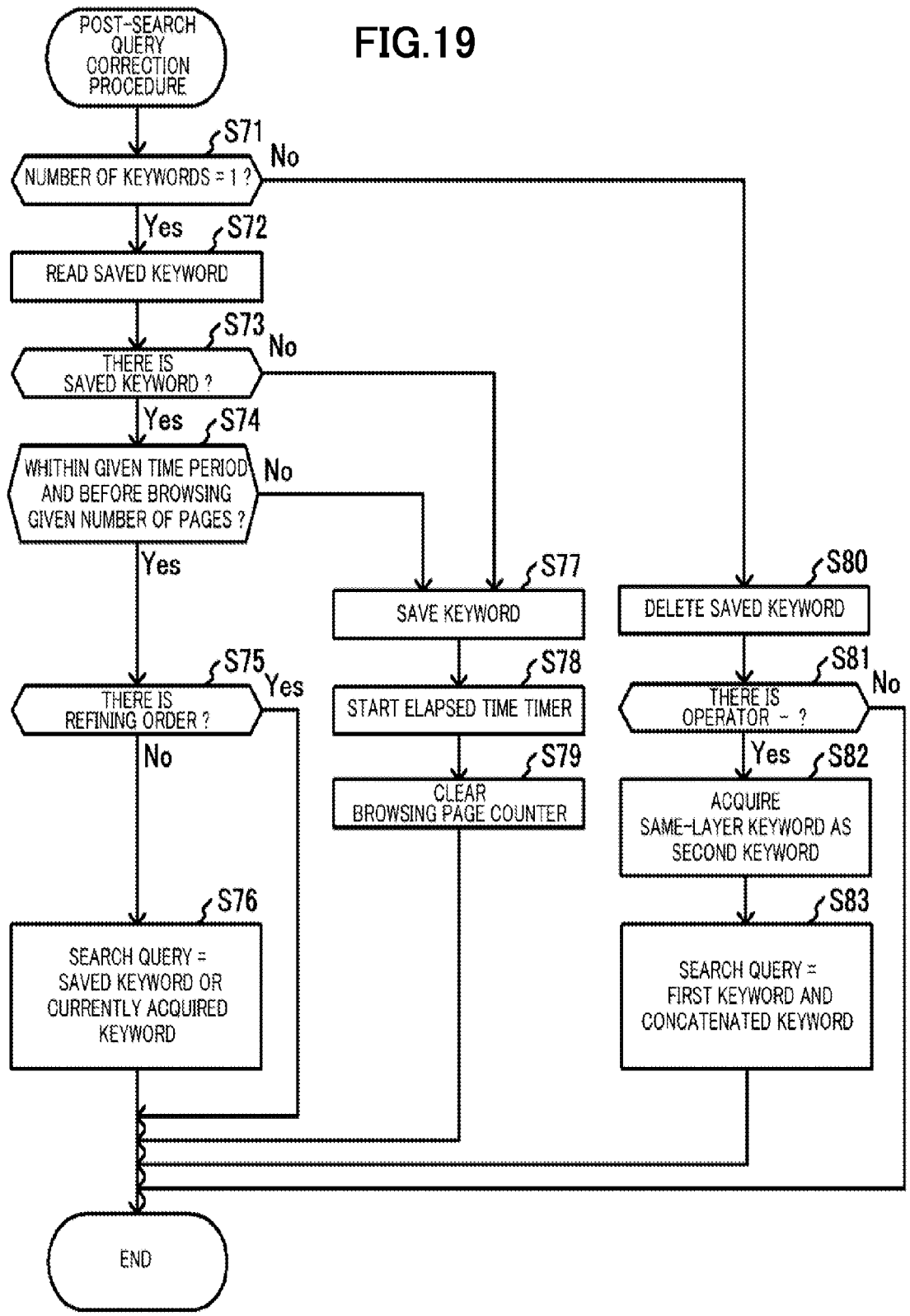
FIG. 19 is a flowchart presenting an example of the post-search query correction procedure executed by the search device.

After the execution of the Step S15 in FIG. 11 ends, the counter 250 executes the post-search query correction procedure as shown in FIG. 19 (Step S16).

As the post-search query correction procedure in FIG. 19 starts, the counter 250 executes the same processing as in the Steps S31 and S32 in FIG. 16 (Steps S71 and S72), and determines that no saved keyword is stored in the information storage 210 (Step S73; No). Then, the counter 250 saves in the information storage 210 information presenting the keyword "FOR STEAK" contained in the search query acquired this time as information presenting a saved keyword (Step S77). Then, the counter 250 clears and then starts a software timer (an elapsed time timer hereafter) measuring the elapsed time since the date/time when the search query containing the saved keyword "FOR STEAK" is specified (the query-specified date/time hereafter) (Step S78). Furthermore, the counter 250 clears the value of a browsing page counter counting the number of web pages the user of the bidder terminal device 102 has browsed since the query-specified date/time to "0" (Step S79), and ends the execution of the post-search query correction procedure.

After the Step S16 in FIG. 11, the counter 250 increase the value of the browsing page counter that is cleared in the Step S79 in FIG. 19 by "1" (Step S17). This is because the user of the bidder terminal device 102 browses the search results page PC1. Then, if the counter 250 determines that the search query contains a single keyword "FOR STEAK" (Step S18; Yes), the above-described processing will be repeated from the Step S11.

Here, the user of the bidder terminal device 102 views the search results page PC1 in FIG. 18 and selects a product "XA BEEF" as a product to consider bidding among the products or other items advertised by the advertisement images PRO1 to PRO3 posted on the search results page PC1.

Then, operated by the user, the inputter of the bidder terminal device 102 enters a signal selecting the advertisement image PRO1 advertising the product "XA BEEF" the user has considered bidding. Subsequently, the bidder terminal device 102 sends to the search device 200 a return request requesting return of the linked advertisement page and containing information presenting the URL "./public_dir/C001.html" of the advertisement page linked to the advertisement image PRO1 selected with the entered signal.

The acquirer 220 in FIG. 6 acquires information received from the bidder terminal device 102 through the LAN card 200f. If it is determined that the acquired information is not an entry request (Step S11; No) or a search query (Step S13; No), but is a return request (Step S20; Yes), the requested page output procedure to output the advertisement page of which return is requested by the request is executed (Step S21).

Figure 20:
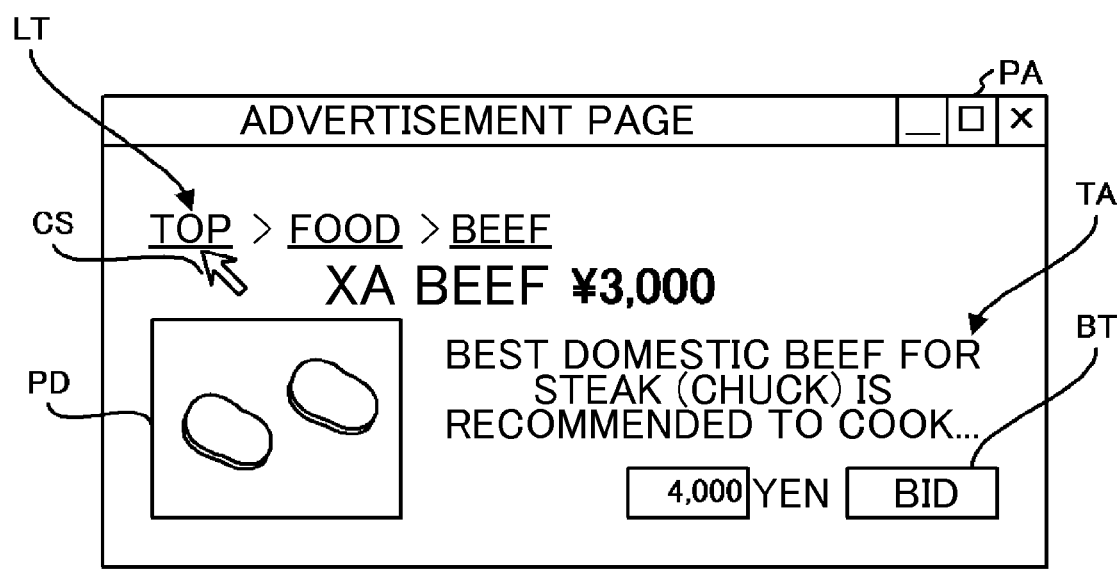
FIG. 20 is an illustration presenting an example of the advertisement page displayed by the bidder terminal device.

In the requested page output procedure, the acquirer 220 in FIG. 6 extracts information presenting the URL "./public_dir/C001.html" of the advertisement page from the return request and the searcher 260 searches the products or other items table in FIG. 9 for information presenting a bid price "3,000" associated with information presenting the advertisement page URL. Then, the searcher 260 reads an advertisement page PA as shown in FIG. 20 that is located at the advertisement page URL from the information storage 210. The advertisement page PA posts an image PD of a product or other item to be advertised and advertisement text TA of the product or other item.

Then, the presenter 240 in FIG. 6 posts information presenting the found bid price "3,000" on the read advertisement page PA and outputs information presenting the advertisement page PA to the LAN card 200f as information presenting the requested page. Subsequently, the counter 235 increases the value of the browsing page counter by "1" (Step S22). Subsequently, the LAN card 200f sends information presenting the advertisement page to the bidder terminal device 102.

The bidder terminal device 102 displays the advertisement page PA in FIG. 20 presented by the information received from the search device 200. The user of the bidder terminal device 102 views the advertisement page PA and if he decides to bid the product "XA BEEF" advertised on the advertisement page PA, operates the inputter of the bidder terminal device 102. Thus, the bidder terminal device 102 sends to the search device 200 a bid request requesting acceptance of the bid and containing the product or other item ID "M001" of the product or other item decided to bid, information presenting a bid price "4,000" specified by the user, and a bidder ID "B101" of the user.

After the processing of the Step S22 in FIG. 11 ends, the acquirer 220 in FIG. 6 acquires from the LAN card 200f information received from the bidder terminal device 102, and determines that the acquired information is not an entry request (Step S11; No), or a search query (Step S13; No), or a return request (Step S20; No), but is a bid request (Step S23; Yes). Then, the bidder 270 in FIG. 6 executes the bidding procedure according to the bid request (Step S24). The bidding procedure is a procedure to save in the products or other items table in FIG. 9 information associating the product or other item ID "M001," bidder ID "B101," and information presenting the bid price "4,000." Incidentally, if it is determined that the acquired information is not a bit request in the Step S23 (Step S23; No), the above-described processing will be repeated from the Step S11.

Here, the advertisement page PA in FIG. 20 posts a character string "TOP" LT linked to the entry page. Therefore, in order to search for a new product or other item again, the user of the bidder terminal device 102 who has viewed the advertisement page PA operates the inputter of the bidder terminal device 102 to place the cursor CS displayed on the display over the character string "TOP" and click on it. Subsequently, the bidder terminal device 102 sends an entry request to the search device 200 and displays the entry page sent from the search device 200. Then, operated by the user, the bidder terminal device 102 enters a search query "FOR ROAST BEEF" specified by the user and sends the search query to the search device 200.

Then, the acquirer 220 in FIG. 6 acquires information received from the bidder terminal device 102 through the LAN card 200f in FIG. 3. If it is determined that the acquired information is not an entry request (Step S11; No) but is a search query (Step S13; Yes), the pre-search query correction procedure in FIG. 16 is executed again (Step S14).

As the pre-search query correction procedure in FIG. 16 starts, the counter 250 in FIG. 6 executes the processing of the Steps S31 and S32 and then determines that information presenting the saved keyword "FOR STEAK" is already saved in the information storage 210 (Step S33; Yes). Subsequently, the counter 250 determines that the search query acquired this time contains no refining order (Step S34; No), and ends the execution of the pre-search query correction procedure.

After the Step S14 in FIG. 11, the search results output procedure is executed again (Step S15). Through this procedure, a search results page on which products "XD BEEF," "XE BEEF," "XF BEEF," and "YA PORK" found in the product or other item keywords table in FIG. 10 based on the search query "FOR ROAST BEEF" are posted is sent to the bidder terminal device 102.

Subsequently, the counter 250 executes the post-search query correction procedure as shown in FIG. 19 again (Step S16). As the post-search query correction procedure in FIG. 19 starts, the counter 250 executes the processing of the Steps S71 to S73. Subsequently, the counter 250 determines whether it is within a given time period since the query-specified date/time and before the user has browsed a given number of web pages based on the timer value of the elapsed time timer that was started in the Step S78 and the value of the browsing page counter that was cleared in the Step S79 (Step S74). More specifically, the counter 250 determines that it is within a given time period since the query-specified date/time if the timer value of the elapsed time timer is lower than a timer value threshold, and determines that it is before the user has browsed a given number of web pages if the browsing page counter value is lower than a browsing page counter threshold. Information presenting the timer value threshold and information presenting the browsing page counter threshold are stored in the information storage 210.

After it is determined that it is within a given time period since the query-specified date/time and before the user has browsed a given number of pages in the Step S74 (Step S74; Yes), the counter 250 determines that the search query "FOR ROAST BEEF" contains no refining order (Step S74; No). Subsequently, the counter 250 creates a search query "FOR STEAK OR FOR ROAST BEEF" in which the saved keyword "FOR STEAK" and the keyword "FOR ROAST BEEF" acquired this time (the currently acquired keyword hereafter) are concatenated by the operator OR. Then, the counter 250 corrects the search query "FOR ROAST BEEF" acquired this time to the created search query "FOR STEAK OR FOR ROAST BEEF" (Step S76), and ends the execution of the post-search query correction.

The reason that the search query "FOR ROAST BEEF" acquired this time is corrected to the created search query "FOR STEAK OR FOR ROAST BEEF" in the Step S76 is that if the user specifies the search query "FOR ROAST BEEF" within a given time period since the search query "FOR STEAK" is specified and before a given number of web pages are browsed since the date/time of this specification, there is a very little difference for the user between the process of selecting a product or other item to bid among the products or other items found using the search query "FOR STEAK" and selecting a product or other item to bid among the products or other items found using the search query "FOR ROAST BEEF" and the process of selecting a product or other item to bid among the products or other items found using the search query "FOR STEAK OR FOR ROAST BEEF." In other words, if the user knows how to use the operator OR well, presumably, the user will specify the search query "FOR STEAK OR FOR ROAST BEEF" instead of specifying the search query "FOR STEAK" and then specifying the search query "ROAST BEEF."

Incidentally, if it is determined that a given time period has elapsed since the query-specified date/time or that the user has browsed a given number of web pages since the query-specified date/time in the Step S74 (Step S74; No), the counter 250 overwrites information presenting the keyword saved in the information storage 210 with information presenting the keyword acquired this time (Step S77), clears and restarts the elapsed time timer (Step S78), clears the browsing page counter (Step S79), and ends the execution of the post-query correction procedure.

The reason that the search query acquired this time is not corrected to a search query in which the previous search query and the keyword acquired this time are concatenated by the operator OR if "No" is determined in the Step S74 is as follows. If the user specifies a search query after a given time period has elapsed since the date/time when the previous search query was specified or the user has browsed a given number of web pages, it is unlikely that the user specifies a search query in which the previous search query and the keyword acquired this time are concatenated by the operator OR even if the user knows how to use the operator OR well, and the user has no intention to refine based on the keyword acquired this time the products or other items found based on the previous search query in many cases.

After the Step S16 in FIG. 11, the counter 250 increases the browsing page counter value by "1" (Step S17), and determines that the corrected search query "FOR STEAK OR FOR ROAST BEEF" contains not "1" but "2" keywords (Step S18; No). Subsequently, the counter 250 executes the counting procedure as shown in FIG. 21 (Step S19), and then the above-described processing will be repeated from the Step S11.

Figure 21:
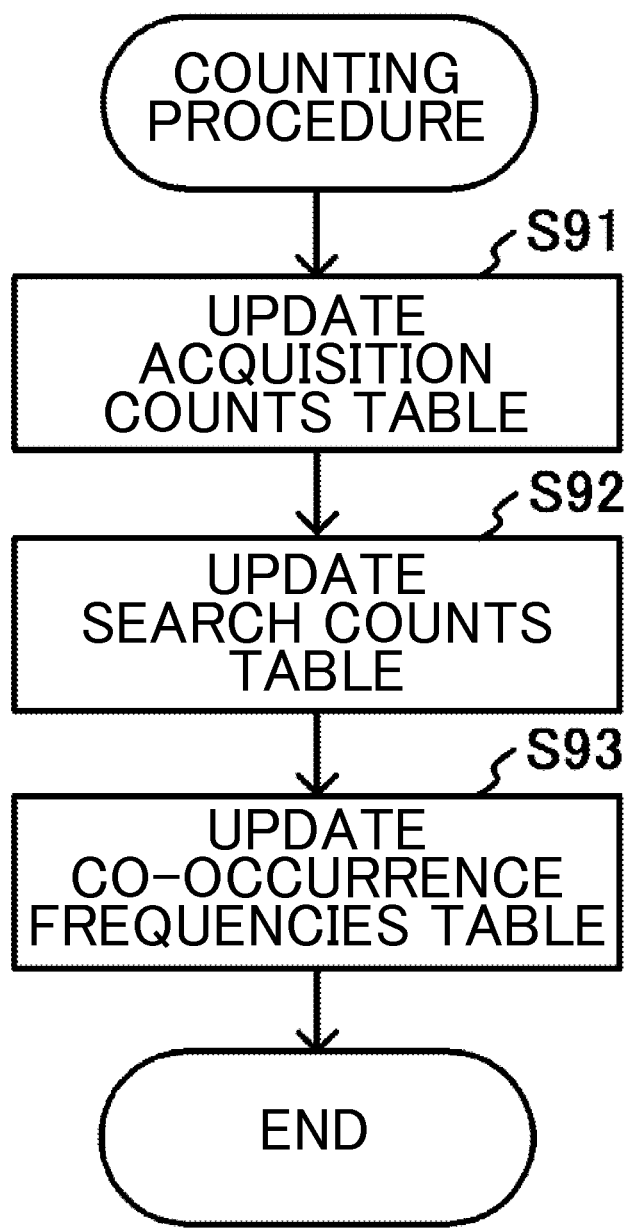
FIG. 21 is a flowchart presenting an example of the counting procedure executed by the search device.

As the counting procedure in FIG. 21 starts, the counter 250 updates the acquisition counts table in FIG. 13 based on the corrected search query "FOR STEAK OR FOR ROAST BEEF" (Step S91). More specifically, the counter 250 updates information presenting the OR query acquisition count "108" that is the number of times the OR query containing the keywords "FOR STEAK" and "FOR ROAST BEEF" is acquired to information presenting an acquisition count "109."

Then, the counter 250 updates information presenting a search count "340" associated with information presenting the keyword "FOR STEAK" contained in the search query to information presenting a search count "341," and updates information presenting a search count "320" associated with information presenting the keyword "FOR ROAST BEEF" contained in the search query to information presenting a search count "321" in the search counts table in FIG. 12 (Step S92).

Then, the counter 250 searches the acquisition counts table in FIG. 13 for information presenting the OR query acquisition count "109" and information presenting the AND query acquisition count "120" associated with information presenting "FOR STEAK" and information presenting "FOR ROAST BEEF." The counter 250 further searches the search counts table in FIG. 12 for information presenting the search count "341" associated with information presenting the keyword "FOR STEAK" contained in the search query and information presenting the search count "321" associated with information presenting the keyword "FOR ROAST BEEF" contained in the search query. Then, the counter 250 calculates the ratio (namely the AND co-occurrence frequency) "18" of the AND query acquisition count "120" to the sum of the search count "341" associated with information presenting the keyword "FOR STEAK" and the search count "321" associated with information presenting the keyword "FOR ROAST BEEF," which are presented by the found information, and the ratio (namely the OR co-occurrence frequency) "16" of the OR query acquisition count "109" to the sum.

Subsequently, the counter 250 updates information presenting the AND co-occurrence frequency "19" and OR co-occurrence frequency "15" associated with information presenting "FOR STEAK" and information presenting "FOR ROAST BEEF" to information presenting the above-calculated AND co-occurrence frequency "18" and OR co-occurrence frequency "16" in the co-occurrence frequencies table in FIG. 14 (Step S93). Subsequently, the counter 250 ends the execution of the counting procedure.

Next, the above-described product or other item auction procedure will be described using a case in which the search device 200 acquires a search query containing a refining order.

As the bidder terminal device 102 sends a search query "FOR STEAK" to the search device 200, a search results page PC1 as shown in FIG. 18 is returned from the search device 200. The user of the bidder terminal device 102 conducts an operation on the inputter of the bidder terminal device 102 to refine the products or other items posted on the search results page PC1 to products described by a keyword "LOIN." Then, the bidder terminal device 102 sends a search query comprising the keyword "LOIN" specified by the user and a refining order to the search device 200.

The acquirer 220 of the search device 200 shown in FIG. 6 acquires information received through the LAN card 200f and determines that the acquired information is not an entry request (Step S11; No) but is a search query (Step S13; Yes). Then, the pre-search query correction procedure in FIG. 16 is executed again (Step S14).

As the pre-search query correction procedure in FIG. 16 starts, the counter 250 in FIG. 6 executes the processing of the Steps S31 to S33. The counter 250 determines that the keyword "FOR STEAK" contained in the search query acquired the previous time is already stored in the information storage 210 (Step S33; Yes), and determines whether the pre-search query acquired this time contains the refining order (Step S34). At this point, the counter 250 determines that the search query contains a refining order (Step S34; Yes), assumes that the search query acquired this time is a query in which the saved keyword "FOR STEAK" and the currently acquired keyword "LOIN" are concatenated by the operator AND, and corrects the search query acquired this time to "FOR STEAK AND LOIN" (Step S35). This is for conducting a search according to the refining order. Subsequently, the counter 250 sets the saved keyword "FOR STEAK" as the first keyword and the keyword "LOIN" acquired this time (currently acquired keyword) as the second keyword, and ends the execution of the search query correction procedure.

After the step S14 in FIG. 11, the search results output procedure is executed (Step S15). In the processing of the Step S15, the products or other items "XA BEEF," "XB BEEF," and "XC BEEF" found based on the first keyword (namely the saved keyword) "FOR STEAK" are refined to the products or other items "XA BEEF" and "XB BEEF" associated with the second keyword (namely the currently acquired keyword) "LOIN" in the product or other item keywords table in FIG. 10. Then, a search results page PC2 posting the refined products or other items as shown in FIG. 22 is returned to the bidder terminal device 102.

Subsequently, the counter 250 executes the post-search query correction procedure as shown in FIG. 19 again (Step S16). As the post-search query correction procedure in FIG. 19 starts, the counter 250 determines that the search query corrected in the pre-search query correction procedure contains not one but two keywords "FOR STEAK" and "LOIN" (Step S71; No). Then, the counter 250 deletes the saved keyword saved in the Step S77 (Step S80). The reason for deleting the saved keyword is that correction using the saved keyword is no longer necessary. Subsequently, the counter 250 determines that the search query does not contain the operator-(Step S81; No), and ends the execution of the post-search query correction procedure.

After the Step S16 in FIG. 11, the counter 250 increases the browsing page counter value by "1" (Step S17) and then determines that the search query contains "2" keywords "FOR STEAK" and "LOIN," that is more than "1" (Step S18; No). Subsequently, the counter 250 executes the counting procedure as shown in FIG. 21 (Step S19) and then repeats the processing of the above Step S11.

Starting the counting procedure in FIG. 21, the counter 250 updates information presenting the AND query acquisition count "100" that is the number of times the AND query in which the keywords "FOR STEAK" and "LOIN" are concatenated is acquired to information presenting the acquisition count "101" in the acquisition counts table in FIG. 13 (Step S91).

Subsequently, the counter 250 updates information presenting a search count "340" associated with information presenting the keyword "FOR STEAK" contained in the search query to information presenting the search count "341" and updates information presenting a search count "160" associated with information presenting the keyword "LOIN" contained in the search query to information presenting the search count "161" in the search counts table in FIG. 12 (Step S92).

Then, the counter 250 searches the acquisition counts table in FIG. 13 for information presenting the OR query acquisition count "41" and information presenting the AND query acquisition count "101" associated with information presenting "FOR STEAK" and information presenting "LOIN." The counter 250 further searches the search counts table in FIG. 12 for information presenting the search count "341" associated with information presenting the keyword "FOR STEAK" contained in the search query and information presenting the search count "161" associated with information presenting the keyword "LOIN" contained in the search query. Then, the counter 250 calculates the ratio (namely the AND co-occurrence frequency) "20" of the AND query acquisition count "101" to the sum of the search count "341" associated with information presenting the keyword "FOR STEAK" and the search count "161" associated with information presenting the keyword "LOIN," which are presented by the found information, and the ratio (namely the OR co-occurrence frequency) "8" of the OR query acquisition count "100" to the sum.

Subsequently, the counter 250 updates information presenting the AND co-occurrence frequency "21" and the OR co-occurrence frequency "7" associated with information presenting "FOR STEAK" and information presenting "LOIN" to information presenting the above-calculated AND co-occurrence frequency "20" and OR co-occurrence frequency "8" in the co-occurrence frequencies table in FIG. 14 (Step S93). Subsequently, the counter 250 ends the execution of the counting procedure.

Next, the above-described product or other item auction procedure will be described using a case in which the search device 200 acquires a search query containing first and second keywords and no operator.

As the bidder terminal device 102 sends a search query "FOR STEAK LOIN" to the search device 200, the acquirer 220 of the search device 200 acquires information received through the LAN card 200f and determines that the acquired information is not an entry request (Step S11; No) but is a search query (Step S13; Yes). Then, after the pre-search query correction procedure in FIG. 16 is executed again (Step S14), the processing of the Steps S15 to S19 is executed and then the above-described processing is repeated from the above-described Step S11.

As the pre-search query correction procedure in FIG. 16 starts, the counter 250 in FIG. 6 determines that the search query contains not "1" but "2" keywords, a first keyword "FOR STEAK" and a second keyword "LOIN" (Step S31; No). Then, the counter 250 determines that the search query contains no operator (Step S36; No), corrects the acquired search query to a search query "FOR STEAK AND LOIN" in which the first keyword and second keyword are concatenated by a predetermined operator AND (Step S37), and ends the execution of the pre-search query correction procedure. Incidentally, information presenting the predetermined operator is stored in the information storage 210. Furthermore, the predetermined operator is not limited to the operator AND, and can be the operator OR or the operator—.

Incidentally, for example, when a search query "FOR STEAK AND LOIN" in which the first and second keywords are concatenated by the operator AND is acquired or when a search query "FOR STEAK OR LOIN" in which the first and second keywords are concatenated by the operator OR is acquired, the counter 250 determines that the search query contains an operator (Step S36; Yes) and ends the execution of the pre-search query correction procedure without executing the processing of the Step S37.

Next, the above-described product or other item auction procedure will be described using a case in which the search device 200 acquires a search query in which first and second keywords are concatenated by the operator—.

As the bidder terminal device 102 sends to the search device 200 a search query "FASHION-MEN'S FASHION" and a category ID "J00001" identifying a category "FASHION," the acquirer 220 of the search device 200 acquires information received through the LAN card 200f and determines that the acquired information is not an entry request (Step S11; No) but is a search query (Step S13; Yes). Then, the counter 250 in FIG. 6 executes the pre-search query correction procedure again (Step S14), in which the query is not corrected.

Subsequently, the search results page output procedure in FIG. 17 is executed (Step S15). As the search results page output procedure starts, the searcher 260 in FIG. 6 searches the category hierarchy table in FIG. 8 for lower-level category IDs "J00011" to "00013" associated with the acquired category ID "J00001." Then, the searcher 260 acquires the system date/time from the OS and searches the products or other items table in FIG. 9 for products IDs "M100" to "M103" associated with the same classification category ID as any of the acquired category ID "J00001" and lower-level category IDs "J00011" to "J00013" and information presenting the exhibition limit time later than the system date/time.

Subsequently, the searcher 260 searches the product or other item keywords table in FIG. 10 for product or other item IDs "M100" to "M102" associated with information presenting the same keyword as "FASHION" contained in the acquired search query among the acquired product or other item IDs "M100" to "M103." Then, the searcher 260 searches for the product or other item ID "M102" based on the keyword "MEN'S FASHION" and excludes the found product or other item ID "M102" from the product or other item IDs "M100" to "M102" found based on the keyword "FASHION" (Step S61 in FIG. 17).

Then, the searcher 260 executes the processing of the Steps S62 to S64, whereby information presenting a search results page on which information presenting a product "ZA SANDALS" identified by the product or other item ID "M100" and a product "ZB SKIRT" identified by the product or other item ID "M101" is posted is sent to the bidder terminal device 102.

After the execution of the Step S15 in FIG. 11 ends, the counter 250 executes the post-search query correction procedure as shown in FIG. 19 (Step S16).

As the post-search query correction procedure in FIG. 19 starts, the counter 250 executes the processing of the Steps S71 and S80 and then determines that the acquired search query contains the operator—(Step S81; Yes). Then, the counter 250 acquires keywords (sibling keywords hereafter) presenting sibling categories of the category presented by the second keyword "MEN'S FASHION" (Step S82).

More specifically, the counter 250 searches the category table in FIG. 7 for a category ID "J00012" associated with information presenting the same category as the second keyword "MEN'S FASHION." Then, the counter 250 searches the category hierarchy table in FIG. 8 for a category ID "J00001" associated with the same immediately lower category ID as the found category ID "J00012," and acquires the immediately lower category IDs "J00011" to "J00013" associated with the found category ID "J00001." Subsequently, the counter 250 acquires from the category table in FIG. 7 information presenting the category names associated with the same category IDs as the immediately lower category IDs "J00011" to "J00013," respectively, and sets the keywords "SHOES," "LADIES' FASHION," and "MEN'S FASHION" presented by the acquired information as the sibling keywords.

Then, the counter 250 creates a concatenated keyword "SHOES OR LADIES' FASHION" in which the sibling keywords "SHOES" and "LADIES' FASHION" excluding the second keyword "MEN'S FASHION" are concatenated by the operator OR. Then, the counter 250 corrects the search query "FASHION-MEN'S FASHION" to a query "FASHION AND (SHOES OR LADIES' FASHION)" in which the first keyword "FASHION" and the concatenated keyword "SHOES OR LADIES' FASHION" are concatenated by the operator AND (Step S83), and then ends the execution of the post-search query correction procedure.

After the Step S16 in FIG. 11, the counter 250 executes the processing of the Steps S17 and S18. Subsequently, the counter 250 executes the counting procedure on the assumption that the search query "FASHION AND (SHOES OR LADIES' FASHION)" is an AND query "FASHION AND SHOES," an AND query "FASHION AND LADIES' FASHION," and an OR query "SHOES OR LADIES' FASHION," and then the above-described processing will be repeated from the Step S11.

The reason that "FASHION-MEN'S FASHION" is corrected to the search query "FASHION AND (SHOES OR LADIES' FASHION)" in the Step S83 is that the user who specified the search query "FASHION-MEN'S FASHION" is often aware of the category "FASHION" being the category above the category "MEN'S FASHION." Furthermore, when the product or other item search results based on the search query "FASHION-MEN'S FASHION" and the product or other item search results based on the search query "FASHION AND (SHOES OR LADIES' FASHION)" are equal, the user is often aware of the category "FASHION" being the category above or below the category "SHOES" and category "SHOES" and the category "SHOES" and category "LADIES' FASHION" being sibling categories.

Closing of the bid for an exhibited product or other item will be described hereafter.

The CPU 200a of the search device 200 shown in FIG. 3 executes a not-shown bid-closing procedure in a given cyclic manner. Thus, the CPU 200a functions as a bid-closer 280 as shown in FIG. 6.

As the bid-closing procedure starts, the bid-closer 280 acquires the system date/time from the OS, and acquires from the products or other items table in FIG. 9 a product or other item ID, information presenting a product or other item name, a classification category ID, information presenting bid prices, bidder IDs, and an exhibitor ID associated with a time that is the above-mentioned time period prior to the acquired date/time or earlier (namely, those of a product of which the exhibition time limit is between the given time period earlier and the present time).

Then, the bid-closer 280 notifies the bidders identified by the bidders ID of the product or other item ID, information presenting the product or other item name, information presenting the bid price, and exhibitor ID of the product or other item of which the bid is closed through, for example, an email. Furthermore, the bid-closer 280 notifies the successful bidder identified by the successful bidder ID of the product or other item ID, information presenting the product or other item name, information presenting the bid price, bidder ID, and the like of the product or other item of which the bid is closed through, for example, an email as well. Subsequently, the bid-closer 280 updates information presenting the sales count associated with the same category ID as the classification category ID of the product or other item of which the bid is closed to a sales count resulting from increasing the count presented by that information by a value "1" in the category table in FIG. 7.

Creation of a category will be described hereafter.

The method of creating a category of which the name is given by a keyword in this embodiment is as follows. On the path from the topmost category of the category hierarchical structure to a category, if at least one of the distributions of the AND co-occurrence frequencies and OR co-occurrence frequencies of the categories situated on the path is in conformity with at least one predetermined distribution pattern, the position of a category of which the name is given by a keyword is identified based on the path and the position pre-associated with the distribution pattern, and the category of which the name is given by the keyword is created at the identified position.

A specific example of the method of creating a category of which the name is given by a keyword will be described hereafter, in which a category contained in the category hierarchical structure is set as "a category of interest," the path from the topmost category of the hierarchical structure to each category immediately below the category of interest is identified if there are categories immediately below the category of interest, or the path from the topmost category of the hierarchical structure to the category of interest is identified if there is no category immediately below the category of interest, and if at least one of the distributions of the AND co-occurrence frequencies and OR co-occurrence frequencies acquired for the identified path is in conformity with at least one predetermined distribution pattern, the position on the path that is pre-associated with the distribution pattern is identified as the position of the category of which the name is given by a keyword.

Incidentally, in the following example, it is assumed that the predetermined distribution pattern is associated with "a candidate condition." Here, the candidate condition is a condition that is satisfied when a category of interest is identified as a category candidate immediately above a category of which the name is given by a keyword. The candidate condition is associated with a type of search that is executed when a query containing keywords is given to the search device 200. Furthermore, when there is a category immediately below a category of interest, the path from the topmost category of the hierarchical structure to the category immediately below the category of interest is identified. On the other hand, when there is no category immediately below a category of interest, the path from the topmost category of the hierarchical structure to the category of interest is identified. At least one of the distributions of the AND co-occurrence frequencies and OR co-occurrence frequencies of the categories situated on the identified path is in conformity with at least one predetermined distribution pattern, the candidate condition associated with the conformed distribution pattern is determined to be satisfied. Therefore, in the following example, a category contained in the category hierarchical structure is set as a category of interest and it is determined whether a candidate condition is satisfied, whereby a category candidate immediately above a category of which the name is given by a keyword is identified. More specific candidate conditions will be described in detail later.

Figure 23:
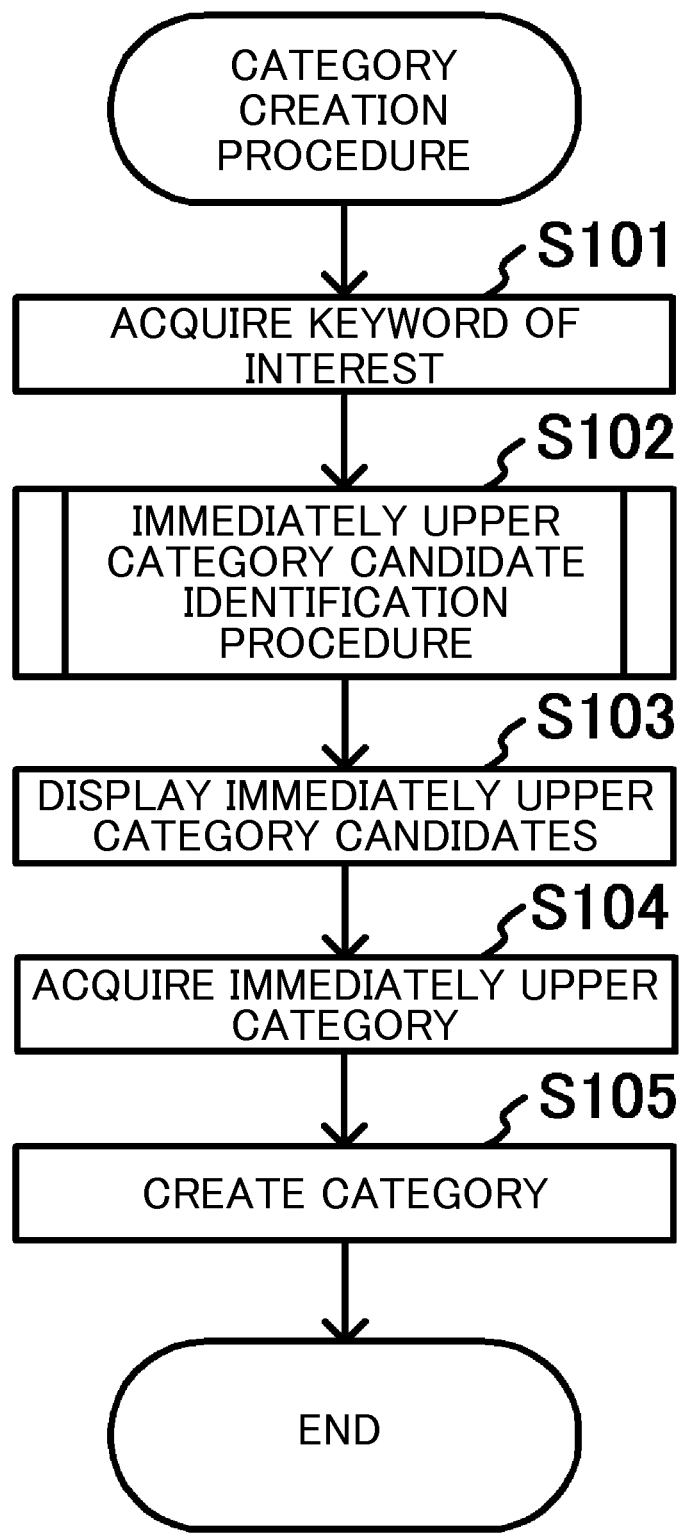
FIG. 23 is a flowchart presenting an example of the category creation procedure executed by the processing device.

The CPU 300a of the processing device 300 shown in FIG. 4 executes the category creation procedure in FIG. 23 in a given cyclic manner so as to function as an acquirer 310, an identifier 320, and a creator 330 in cooperation with the LAN card 300f.

As the category creation procedure in FIG. 23 starts, the acquirer 310 in FIG. 6 acquires information presenting a keyword specified by the user and presenting a new category to create (a keyword of interest hereafter), for example, from the keyboard 300i in FIG. 4 (Step S101). The following explanation will be made using a case in which a keyword of interest "TONGUE" is acquired.

Figure 24:
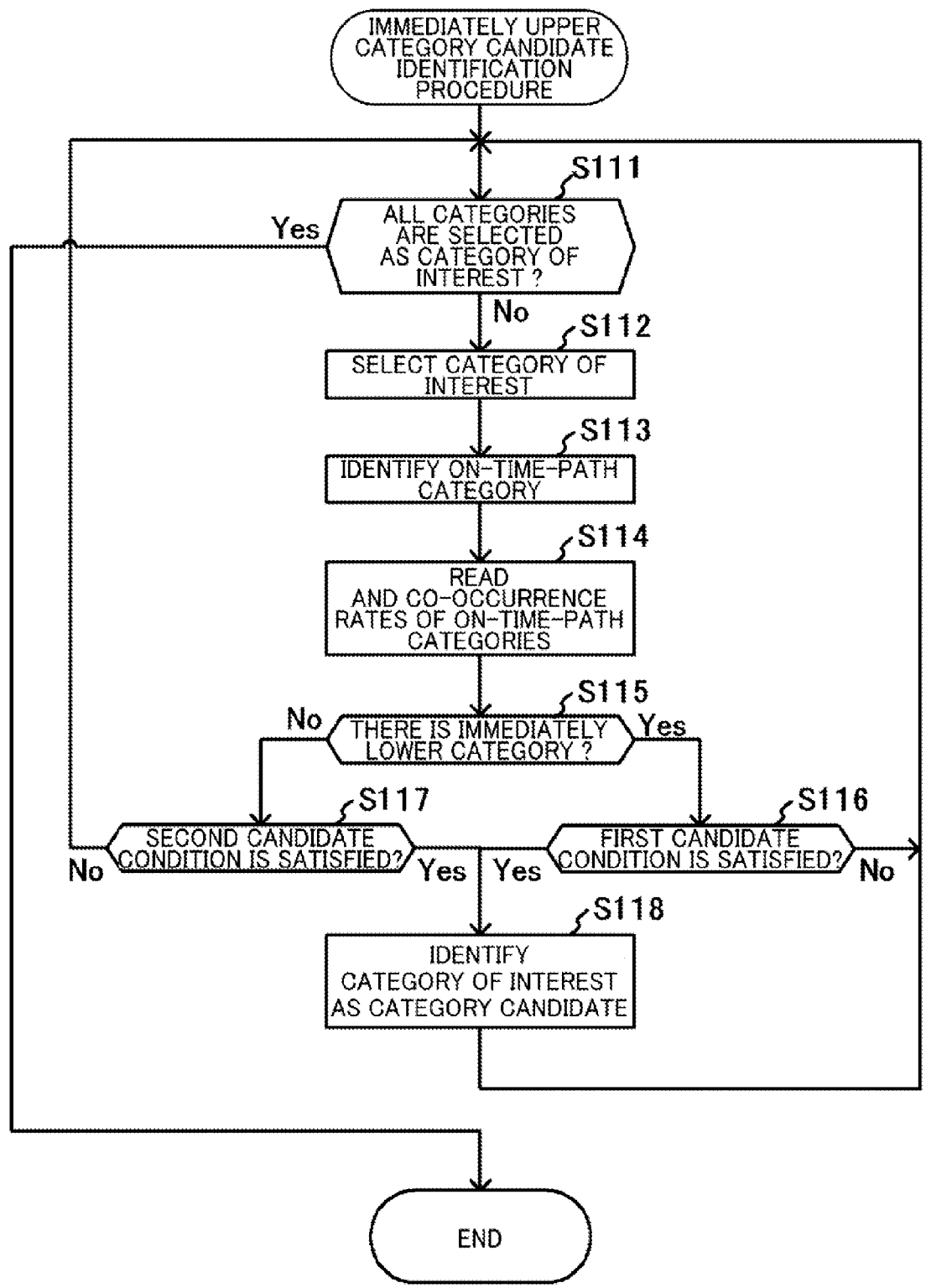
FIG. 24 is a flowchart presenting an example of the immediately upper category candidate identification procedure executed by the processing device.

Then, the acquirer 310 executes the immediately upper category candidate identification procedure as shown in FIG. 24 (Step S102). As execution of the immediately upper category candidate identification procedure in FIG. 24 starts, the acquirer 310 reads the category table in FIG. 7 from the information storage 210 of the search device 200, and determines whether all categories saved in the category table have been selected as a category of interest in the processing of Step 112 (Step S111). At this point, if it is determined that not all categories have been selected as a category of interest (Step S111; No), the acquirer 310 selects a category of interest among the categories that have not been selected as a category of interest (Step S112).

Then, the acquirer 310 reads the category hierarchy table in FIG. 8 from the information storage 210 of the search device 200, and identifies the path from the topmost category of the hierarchical structure to each category immediately below the category of interest if there are categories immediately below the category of interest. On the other hand, if there is no category immediately below the category of interest, the acquirer 310 identifies the path from the topmost category of the hierarchical structure to the category of interest. Then, the acquirer 310 identifies the categories situated on the identified path (on-the-path categories hereafter) (Step S113).

For example, when a category "BEEF" is selected as a category of interest in the processing of the Step S112, the acquirer 310 identifies immediately lower categories "LOIN," "ENTRAILS," and "OTHERS" associated with the selected category of interest "BEEF" in the category hierarchy table in FIG. 8 as on-the-path categories. The acquirer 310 further identifies a category "FOOD" associated with the category of interest "BEEF" in the category hierarchy table in FIG. 8 as an on-the-path category. The acquirer 310 further identifies the category of interest "BEEF" as an on-the-path category. Incidentally, the category "OTHERS" does not need to be identified as an on-the-path category.

Then, the acquirer 310 reads the co-occurrence frequencies table in FIG. 14 from the information storage 210 of the search device 200, and reads the AND co-occurrence frequencies between the category names of the on-the-path categories identified in the processing of the Step S113 and the keyword of interest (Step S114).

For example, when the on-the-path categories "FOOD," "BEEF," "LOIN," and "ENTRAILS" corresponding to the category of interest "BEEF" are identified in the processing of the Step S113, the acquirer 310 reads from the co-occurrence frequencies table in FIG. 14 the AND co-occurrence frequency "10" associated with the keyword of interest "TONGUE" and category name "FOOD," the AND co-occurrence frequency "20" associated with the keyword of interest "TONGUE" and category name "BEEF," the AND co-occurrence frequency "2" associated with the keyword of interest "TONGUE" and category name "LOIN," and the AND co-occurrence frequency "2" associated with the keyword of interest "TONGUE" and category name "ENTRAILS."

Incidentally, instead of reading the AND co-occurrence frequencies from the information storage 210 of the search device 200, as for those that are already read from the information storage 210 and stored in the RAM 300c of the processing device 300 in the preceding processing, the acquirer 310 can read the AND co-occurrence frequencies from the RAM 300c in the Step S114.

Then, the acquirer 310 determines whether there is a category immediately below the category of interest selected in the processing of the Step S112 (Step S115). More specifically, the acquirer 310 reads the category hierarchy table in FIG. 8 from the information storage 210 of the search device 200, and determines whether there is an immediately lower category corresponding to the category of interest.

If it is determined that there is a category immediately below the category of interest (Step S115; Yes), the identifier 320 determines whether a first candidate condition is satisfied (Step S116). If it is determined that the first candidate condition is not satisfied (Step S116; No), the identifier 320 returns to the processing of the Step S111.

Here, the first candidate condition is one of the above-mentioned candidate conditions. More specifically, the first candidate condition is associated with a search query in which keywords are concatenated by the operator AND as a type of search. Further specifically, the first candidate condition is that the distribution of the AND co-occurrence frequencies of the categories situated on the path from the topmost category of the hierarchical structure to each of the categories immediately below the category of interest is in conformity with a given distribution pattern associated with the first candidate condition. The given distribution pattern associated with the first candidate condition is a distribution pattern presented by a sequence of frequencies and the frequencies include a frequency sufficiently low with reference to a given comparison criterion at the end position. Then, this distribution pattern is pre-associated with the position of the sufficiently low frequency. Therefore, if the AND co-occurrence frequency acquired for an immediately lower category in the Step S114 is sufficiently lower than the AND co-occurrence frequencies acquired for the category of interest and the categories above the category of interest excluding the topmost one with reference to a given comparison criterion, the distribution of the AND co-occurrence frequencies of the on-the-path categories is in conformity with the given distribution pattern associated with the first candidate condition, whereby the first candidate condition is satisfied.

In other words, as the AND co-occurrence frequency acquired for an on-the-path category is higher, presumably, the user is highly aware that the category is a category above or below the category of which the name is given by the keyword of interest, namely not a sibling category. On the other hand, as the AND co-occurrence frequency acquired for an on-the-path category is lower, presumably, the user is highly aware that the category is not a category above or below the category of which the name is given by the keyword of interest, namely is a sibling category. Therefore, if the AND co-occurrence frequency acquired for an immediately lower category is sufficiently lower than the AND co-occurrence frequencies acquired for the category of interest and the categories above the category of interest excluding the topmost one with reference to a given comparison criterion, the category of interest is a category above or below the category of which the name is given by the keyword of interest and the immediately lower category is a sibling category of the category of which the name is given by the keyword of interest. Then, presumably, the category of interest is a category candidate immediately above the category of which the name is given by the keyword of interest.

More specifically, for example, the identifier 320 determines that the AND co-occurrence frequency "2" acquired for the categories "LOIN" and "ENTRAILS" immediately below the category of interest "BEEF" is sufficiently lower than the AND co-occurrence frequency "20" acquired for the category of interest "BEEF" and the AND co-occurrence frequency "10" acquired for the category "FOOD" above the category of interest "BEEF" excluding the topmost one according a given comparison criterion. Therefore, the identifier 320 determines that the first candidate condition is satisfied.

On the other hand, for example, when the category of interest selected in the processing of the Step S112 is "SHOES," it is determined that the AND co-occurrence frequency "1" acquired for the category "MEN'S SHOES" immediately below the category of interest "SHOES" is not sufficiently lower than the AND co-occurrence frequency "1" acquired for the category of interest "SHOES" and the AND co-occurrence frequency "1" acquired for the category "FASHION" above the category of interest "SHOES" excluding the topmost one with reference to a given comparison criterion. Therefore, the identifier 320 determines that the first candidate condition is not satisfied.

On the other hand, if it is determined that there is no category immediately below the category of interest (Step S115; No), the identifier 320 determines whether a second candidate condition is satisfied (Step S117). If it is determined that the second candidate condition is not satisfied (Step S117; No), the identifier 320 returns to the processing of the Step S111.

Here, the second candidate condition is one of the above-mentioned candidate conditions. More specifically, like the first candidate condition, the second candidate condition is associated with a search query in which keywords are concatenated by the operator AND as a type of search. Further specifically, the second candidate condition is that the distribution of the AND co-occurrence frequencies of the categories situated on the path from the topmost category of the hierarchical structure to the category of interest is in conformity with a given distribution pattern associated with the second candidate condition. The given distribution pattern associated with the second candidate condition is a distribution pattern presented by a sequence of frequencies and the frequencies are all sufficiently higher than a frequency presenting the absence of co-occurrence with reference to a given comparison criterion. This distribution pattern is pre-associated with the position immediately below the frequency at the end in the sequence of frequencies. Therefore, if there is no category immediately below the category of interest and the AND co-occurrence frequencies acquired for the category of interest and the categories above the category of interest excluding the topmost one are sufficiently higher than a frequency presenting the absence of co-occurrence with reference to a given comparison criterion, the distribution of the AND co-occurrence frequencies of the on-the-path categories is in conformity with the given distribution pattern associated with the second candidate condition, whereby the second candidate condition is satisfied.

In other words, when there is no category immediately below the category of interest, namely the category of interest is an end category, and the AND co-occurrence frequencies acquired for the on-the-path categories are sufficiently higher than a frequency presenting the absence of co-occurrence with reference to a given comparison criterion, presumably, the user is highly aware that the category of interest is a category above the category of which the name is given by the keyword of the interest. Therefore, presumably, the category of interest is a category candidate immediately above the category of which the name is given by the keyword of interest.

A specific example of the second candidate condition will be described hereafter using a case in which the keyword of interest is "FOR STEAK." For example, it is assumed that the category of interest selected in the processing of the Step S112 is "LOIN," on-the-path categories "FOOD," "BEEF," and "LOIN" corresponding to the category of interest "LOIN" are identified in the processing of the Step S113, and the AND co-occurrence frequency "10" associated with the keyword of interest "FOR STEAK" and category name "FOOD", the AND co-occurrence frequency "18" associated with the keyword of interest "FOR STEAK" and category name "BEEF", and the AND co-occurrence frequency "25" associated with the keyword of interest "FOR STEAK" and category name "LOIN" are acquired in the processing of the Step S114. In such a case, the identifier 320 determines that there is no category immediately below the category of interest "LOIN." The identifier 320 further determines that the AND co-occurrence frequencies "10," "18," and "25" acquired for the on-the-path categories "FOOD," "BEEF," and "LOIN" are sufficiently higher than a frequency presenting the absence of co-occurrence with reference to a given comparison criterion. Therefore, the identifier 320 determines that the second candidate condition is satisfied.

On the other hand, for example, it is assumed that the category of interest selected in the processing of the Step S112 is "ENTRAILS," on-the-path categories "FOOD," "BEEF," and "ENTRAILS" corresponding to the category of interest "ENTRAILS" are identified in the processing of the Step S113, and the AND co-occurrence frequency "10" associated with the keyword of interest "FOR STEAK" and category name "FOOD", the AND co-occurrence frequency "18" associated with the keyword of interest "FOR STEAK" and category name "BEEF", and the AND co-occurrence frequency "1" associated with the keyword of interest "FOR STEAK" and category name "ENTRAILS" are acquired in the processing of the Step S114. In such a case, the identifier 320 determines that there is no category immediately below the category of interest "ENTRAILS." However, the identifier 320 determines that the AND co-occurrence frequencies "10" and "18" acquired for the on-the-path categories "FOOD" and "BEEF" are sufficiently higher than a frequency presenting the absence of co-occurrence with reference to a given comparison criterion but the AND co-occurrence frequency "1" acquired for the on-the-path category "ENTRAILS" is not sufficiently higher than a frequency presenting the absence of co-occurrence with reference to a given comparison criterion. Therefore, the identifier 320 determines that the second candidate condition is not satisfied.

If it is determined that the first candidate condition is satisfied (Step S116; Yes) or if it is determined that the second candidate condition is satisfied (Step S117; Yes), the identifier 320 identifies the category of interest as a category candidate immediately above the category of which the name is given by the keyword of interest (an immediately upper category candidate hereafter). Then, the identifier 320 returns to the processing of the Step S111.

The above-described processing is repeated and if the acquirer 310 determines that all categories have been selected as a category of interest in the processing of the Step S112 (Step S111; Yes), the immediately upper category candidate identification procedure ends.

Then, the creator 330 displays information presenting the immediately upper category candidates identified in the immediately upper category candidate identification procedure of the Step S102 in FIG. 23 on, for example, the LCD 300h in FIG. 4 (Step S103).

Then, the creator 330 acquires information presenting a category selected by the user among the immediately upper category candidates, namely a category immediately above the category of which the name is given by the keyword of interest, for example, from the keyboard 200i in FIG. 4 (Step S104).

Then, the creator 330 creates a category of which the name is given by the keyword of interest immediately below the immediately upper category acquired in the Step S104 (Step S105).

Figure 25:
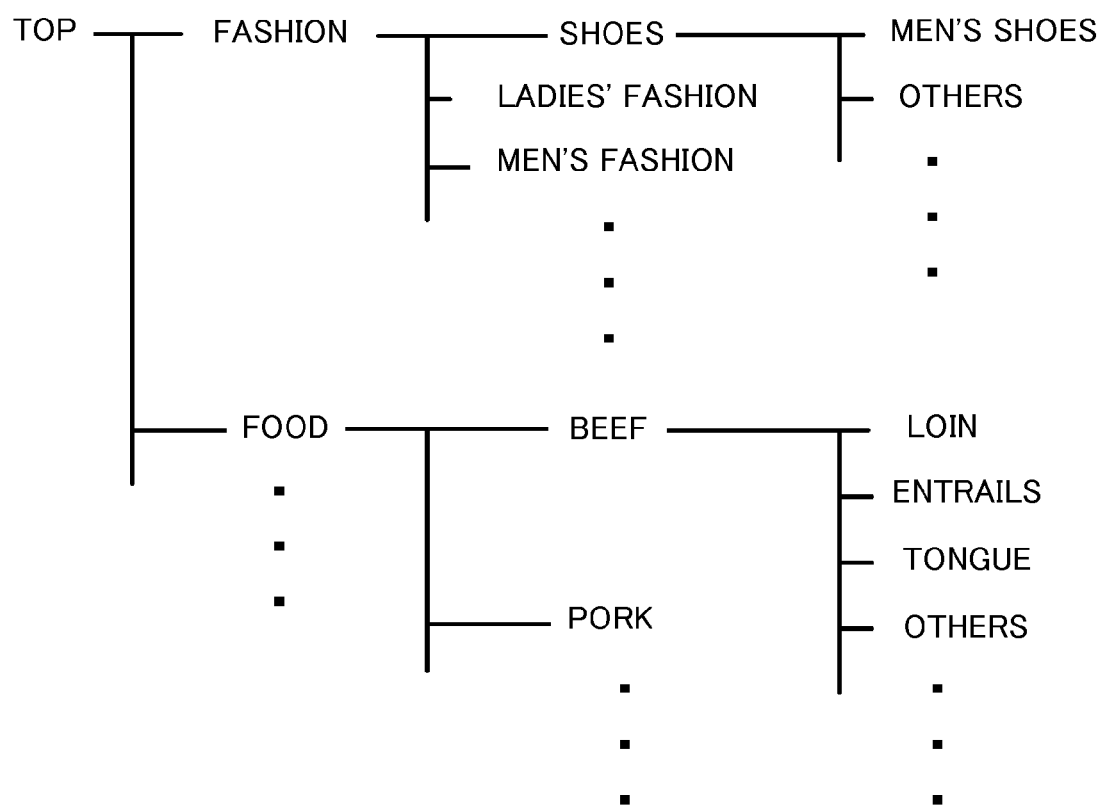
FIG. 25 is an illustration for explaining an exemplary category structure created in the category creation procedure.

For example, if a category "BEEF" is selected by the user as the category immediately above the category of which the name is given by the keyword of interest "TONGUE" in the Step S104, the creator 330 creates a category "TONGUE" immediately below the category "BEEF" as shown in FIG. 25.

More specifically, the creator 330 creates a category ID for the category of which the name is given by the keyword of interest and saves in the category table in FIG. 7 the created category ID and information presenting the category name of the category. Then, the creator 330 searches the category table for the category ID of the immediately upper category selected by the user. Subsequently, the creator 330 sets the category ID of the category of which the name is given by the keyword of interest as an immediately lower category ID and saves in the category hierarchy table in FIG. 8 information associating the category ID of the immediately upper category and the category ID of the category of which the name is given by the keyword of interest. Then, the execution of the category creation procedure ends.

Category reclassification will be described hereafter.

After the category creation procedure in FIG. 23 ends, the CPU 200a of the search device 200 shown in FIG. 3 functions as a reclassifier 290 reclassifying the products or other items into a newly created category and existing categories.

For example, when a category "TONGUE" is created immediately below the category "BEEF" in the category creation procedure, the reclassifier 290 reclassifies the products or other items classified into the category "BEEF" into the existing categories "LOIN," "ENTRAILS," and "OTHERS" and newly created category "TONGUE" immediately below the category "BEEF."

More specifically, the reclassifier 290 searches the products or other items table in FIG. 9 for product or other item IDs associated with information presenting the same classification category names as information presenting the categories immediately below the category "BEEF." Then, the reclassifier 290 searches the product or other item keywords table in FIG. 10 for information presenting the product or other item names and information presenting the keywords that are associated with the found product or other item IDs. Subsequently, the reclassifier 290 reclassifies the products or other items into any of the existing categories "LOIN," "ENTRAILS," and "OTHERS" and newly created category "TONGUE" based on any one or more of information presenting the product or other item names and information presenting the keywords of the products or other items identified by the product or other item IDs. More specifically, the reclassifier 290 can classify a product or other item into a category presented by a keyword that is partially or totally equal to the name of the product or other item. Similarly, the reclassifier 290 can classify a product into the category "TONGUE" that is immediately below the category "BEEF" and contained in the category "BEEF" when information presenting the keyword "TONGUE" and information presenting "BEEF" are associated with the product or other item ID.

Subsequently, the reclassifier 290 updates information presenting the classification category ID and classification category name associated with a reclassified product or other item ID to information presenting the category ID and category name of the category into which the product or other item ID is reclassified in the products or other items table in FIG. 9.

As described above, the processing device 300 according to this embodiment identifies a category of interest as a category candidate immediately above the category of which the name is given by a keyword when the co-occurrence frequencies between the category names of on-the-path categories and the keyword satisfy the candidate condition. Therefore, in order to add a new category to the hierarchical structure having categories, a category candidate immediately above the category can be identified. Therefore, a new category can be created at a proper position.

(Modified Embodiment 1)

In the above embodiment, the identifier 320 reads the AND co-occurrence frequencies acquired for the on-the-path categories in the processing of the Step S114 of the immediately upper category candidate identification procedure in FIG. 24, and identifies the category of interest as an immediately upper category candidate when the read AND co-occurrence frequencies satisfy the first candidate condition or the second candidate condition. However, the immediately upper category candidate identification method is not restricted to the above. For example, instead of reading the AND co-occurrence frequencies acquired for the on-the-path categories, it is possible in the processing of the Step S114 of the immediately upper category candidate identification procedure to read the OR co-occurrence frequencies acquired for the on-the-path categories and identify the category of interest as an immediately upper category candidate when the read OR co-occurrence frequencies satisfy a given candidate condition.

An example of the given candidate condition in the case of reading the OR co-occurrence frequencies instead of the AND co-occurrence frequencies as described above is that the distribution of the OR co-occurrence frequencies of the categories situated on the path from the topmost category of the hierarchical structure to each of the categories immediately below the category of interest is in conformity with a given distribution pattern associated with the candidate condition. The given distribution pattern associated with the candidate condition is a distribution pattern presented by a sequence of frequencies and the frequencies include a frequency sufficiently high with reference to a given comparison criterion at the end position. Then, this distribution pattern is pre-associated with the position of the sufficiently high frequency. Therefore, if the OR co-occurrence frequency acquired for a category immediately below the category of interest is sufficiently higher than the OR co-occurrence frequencies acquired for the category of interest and the categories above the category of interest excluding the topmost one with reference to a given comparison criterion, the distribution of the OR co-occurrence frequencies of the on-the-path categories is in conformity with the given distribution pattern associated with the candidate condition, whereby the candidate condition is satisfied.

In other words, as the OR co-occurrence frequency acquired for an on-the-path category is lower, presumably, the user is highly aware that the category is not a sibling category of the category of which the name is given by the keyword of interest. On the other hand, as the OR co-occurrence frequency acquired for an on-the-path category is higher, presumably, the user is highly aware that the category is a sibling category of the category of which the name is given by the keyword of interest. Therefore, if the OR co-occurrence frequency acquired for an immediately lower category is sufficiently higher than the OR co-occurrence frequencies acquired for the category of interest and the categories above the category of interest excluding the topmost one with reference to a given comparison criterion, presumably, the category immediately below the category of interest is a sibling category of the category of which the name is given by the keyword of interest, in other words the category of interest is a category candidate immediately above the category of which the name is given by the keyword of interest.

Therefore, instead of reading the AND co-occurrence frequencies acquired for the on-the-path categories, it is possible in the processing of the Step S114 of the immediately upper category candidate identification procedure to read the OR co-occurrence frequencies acquired for the on-the-path categories and if the read OR co-occurrence frequencies satisfy the above-described given candidate condition, identify the category of interest as an immediately upper category candidate, whereby for adding a new category, a category candidate immediately above the category can be identified as in the above-described embodiment. Therefore, a new category can be created at a proper position.

(Modified Embodiment 2)

Alternatively, the method of identifying an immediately upper category candidate can utilize both the AND co-occurrence frequencies and OR co-occurrence frequencies.

More specifically, it is possible in the processing of the Step S114 of the immediately upper category candidate identification procedure to read the AND co-occurrence frequencies and OR co-occurrence frequencies acquired for the on-the-path categories, and if the read AND co-occurrence frequencies and OR co-occurrence frequencies satisfy a given candidate condition, identify the category of interest as an immediately upper category candidate.

An example of the given candidate condition in the case of reading both the AND co-occurrence frequencies and OR co-occurrence frequencies as described above is that the distribution of the AND co-occurrence frequencies of the categories situated on the path from the topmost category of the hierarchical structure to each of the categories immediately below the category of interest is in conformity with a given first distribution pattern associated with the candidate condition and the distribution of the OR co-occurrence frequencies of the categories situated on the path, which corresponds to the position associated with the above distribution pattern, is in conformity with a given second distribution pattern. The given first distribution pattern associated with the candidate condition is a distribution pattern presented by a sequence of frequencies and the frequencies include frequencies sufficiently low with reference to a given comparison criterion at the end position and the position immediately above it. Then, this distribution pattern is pre-associated with the positions of the sufficiently low frequencies. The given second distribution pattern associated with the candidate condition is a distribution pattern presented by a sequence of two frequencies and the two frequencies include a frequency sufficiently low with reference to a given comparison criterion at an upper position. Then, this distribution pattern is pre-associated with the position immediately below the sufficiently low frequency. Therefore, if the AND co-occurrence frequencies acquired for the category of interest and a category immediately below the category of interest are sufficiently lower than the AND co-occurrence frequencies acquired for the categories above the category of interest excluding the topmost one with reference to a given comparison criterion and the OR co-occurrence frequency acquired for the category of interest is sufficiently lower than the OR co-occurrence frequency acquired for the immediately lower category with reference to a given comparison criterion, the distributions of the AND co-occurrence frequencies and OR co-occurrence frequencies of the on-the-path categories are in conformity with the given first distribution pattern and second distribution pattern associated with the candidate condition, whereby the candidate condition is satisfied.

This is because when there are consecutive categories of which the AND co-occurrence frequencies are low among the on-the-path categories and their OR co-concurrence frequencies are compared, a category having a lower OR co-occurrence frequency is presumably not a sibling category of the category of which the name is given by the keyword of interest, namely is an immediately upper category candidate.

Another example of the given candidate condition in the case of reading both the AND co-occurrence frequencies and OR co-occurrence frequencies as described above is that the distribution of the OR co-occurrence frequencies of the categories situated on the path from the topmost category of the hierarchical structure to each of the categories immediately below the category of interest is in conformity with a given first distribution pattern associated with the candidate condition and the distribution of the AND co-occurrence frequencies of the categories situated on the path, which corresponds to the position associated with the above distribution pattern, is in conformity with a given second distribution pattern. The given first distribution pattern associated with the candidate condition is a distribution pattern presented by a sequence of frequencies and the frequencies include frequencies sufficiently high with reference to a given comparison criterion at the end position and the position immediately above it. Then, this distribution pattern is pre-associated with the positions of the sufficiently high frequencies. The given second distribution pattern associated with the candidate condition is a distribution pattern presented by a sequence of two frequencies and the two frequencies include a frequency sufficiently high with reference to a given comparison criterion at an upper position. Then, this distribution pattern is pre-associated with the position immediately below the sufficiently high frequency. Therefore, if the OR co-occurrence frequencies acquired for the category of interest and a category immediately below the category of interest are sufficiently higher than the OR co-occurrence frequencies acquired for the categories above the category of interest excluding the topmost one with reference to a given comparison criterion and the AND co-occurrence frequency acquired for the category of interest is sufficiently higher than the AND co-occurrence frequency acquired for the immediately lower category with reference to a given comparison criterion, the distributions of the AND co-occurrence frequencies and OR co-occurrence frequencies of the on-the-path categories are in conformity with the given first distribution pattern and second distribution pattern associated with the candidate condition, whereby the candidate condition is satisfied.

This is because when there are consecutive categories of which the OR co-occurrence frequencies are high among the on-the-path categories and their AND co-occurrence frequencies are compared, a category having a higher AND co-occurrence frequency is presumably an immediately upper category candidate of the category of which the name is given by the keyword of interest.

(Modified Embodiment 3)

Furthermore, in the above embodiment, the creator 330 creates a category of which the name is given by a keyword of interest immediately below a candidate selected by the user among the immediately upper category candidates identified by the identifier 320. However, when the creator 330 creates a category of which the name is given by a keyword of interest, it is not restricted to selection by the user which category among the immediately upper categories identified by the identifier 320 is used as the immediately upper category to create a category of which the name is given by a keyword of interest. For example, the creator 330 can use all immediately upper category candidates identified by the identifier 320 as the immediately upper category and create a category of which the name is given by a keyword of interest immediately below them.

(Modified Embodiment 4)

The above embodiment is described using a case in which in order to create a new category of which the name is given by a keyword of interest, the category of which the name is given by a keyword of interest is created immediately below an immediately upper category candidate identified by the identifier 320. The function of the processing device 300 is not restricted to the function to create a new category. For example, the processing device 300 can execute the immediately upper category candidate identification procedure using the name of an already created category (an existing category hereafter) as a keyword of interest to identify a category candidate immediately above the existing category. With the identified immediately upper category candidate being presented to the user, the user can compare the category currently immediately above the existing category with the identified immediately upper category candidate and determine whether or not the current position of the existing category in the category hierarchical structure is proper. Furthermore, the processing device 300 can comprise a determination function to determine whether or not the position of an existing category in the hierarchical structure is in conformity with the position identified by the identifier 320 using the name of the existing category as a keyword of interest.

(Modified Embodiment 5)

Furthermore, the above-embodiment is described using a case in which in order to create a new category of which the name is given by a keyword of interest, the identifier 320 determines whether the candidate condition is satisfied using the categories contained in the category hierarchical structure as a category of interest to identify an immediately upper category candidate. The identifier 320 can identify the position in the hierarchical structure of a category of which the name is given by a keyword of interest without setting a category of interest. For example, it is possible that if at least a part of the distribution of at least either the AND co-occurrence frequencies or the OR co-occurrence frequencies in the category hierarchical structure is in conformity with at least one predetermined distribution pattern, the identifier 320 identifies the position in the hierarchical structure of a category of which the name is given by a keyword of interest based on the conformed part in the hierarchical structure and the position pre-associated with the distribution pattern.

More specifically, the processing device 300 stores at least one or more distribution patterns in association with a predetermined position. An example of the given distribution patterns is a distribution pattern of frequencies some of which are sufficiently low with reference to a given comparison criterion (a first distribution pattern hereafter). The positions of the sufficiently low frequencies as the given position are associated with this distribution pattern. Another example of the distribution pattern is a distribution pattern of frequencies that are all sufficiently higher than a frequency presenting the absence of co-occurrence with reference to a given comparison criterion (a second distribution pattern hereafter). The position immediately below the end of the distribution of the frequencies as the given position is associated with this distribution pattern.

Then, the identifier 320 compares the distribution of at least either the AND co-occurrence frequencies or the OR co-occurrence frequencies in the category hierarchical structure with the pre-stored distribution patterns. Then, when at least a part of the distribution of at least either the AND co-occurrence frequencies or the OR co-occurrence frequencies in the category hierarchical structure is in conformity with one of the distribution patterns or falls within a given error range, the identifier 320 identifies the position in the hierarchical structure of a category of which the name is given by a keyword of interest based on the conformed part in the hierarchical structure and the position associated with the distribution pattern. More specifically, when it is determined to be in conformity, the identifier 320 identifies the position corresponding to the position associated with the distribution pattern in the conformed part in the hierarchical structure as the position of a category of which the name is given by a keyword of interest. As described above, the identifier 320 can identify the position of a category of which the name is given by a keyword of interest by determination through a pattern matching to determine whether at least a part of the distribution of at least either the OR co-occurrence frequencies or the OR co-occurrence frequencies in the category hierarchical structure is in conformity with the distribution pattern. In this way, duplicated check on the co-occurrence frequencies in identifying an immediately upper category candidate using the categories contained in the category hierarchical structure as a category of interest can be reduced.

Furthermore, it is possible that when a first part that is at least a part of the distribution of the AND co-occurrence frequencies in the category hierarchical structure is in conformity with a first distribution pattern and a second part that is at least a part of the distribution of the AND co-occurrence frequencies in the category hierarchical structure is in conformity with a second distribution pattern, the identifier 320 identifies the position of a category of which the name is given by a keyword of interest based on the second part and the position pre-associated with the second distribution pattern.

Furthermore, the above-described Embodiment and Modified Embodiments 1 to 5 can be combined with each other. The processing device 300 comprising the configuration for realizing the function according to any of the Embodiment and Modified Embodiments 1 to 5 can be provided in the first place, and a system comprising devices and comprising the configuration for realizing the function of the Embodiment as the whole system can be provided as well.

Incidentally, the processing device 300 comprising the pre-configuration for realizing the function according to any of the Embodiment and Modified Embodiments 1 to 5 can be provided in the first place, and an existing processing device can be made to function as a processing device according to the Embodiment as well by applying programs. In other words, an existing processing device can be made to function as the processing device 300 according to the Embodiment by applying programs for realizing the functional configuration of the processing device 300 exemplified by any of the Embodiment and Modified Embodiments 1 to 5 so that a computer (CPU or the like) controlling the existing processing device can execute the programs.

The above programs can be distributed by any method and, for example, stored and distributed on a recording medium such as a memory card, CD-ROM, or DVD-ROM, or distributed via a communication medium such as the Internet. Furthermore, the processing method according to the present disclosure can be implemented using the processing device 300 according to the Embodiment.

A preferred embodiment of the present disclosure is described above. The present disclosure is not confined to this particular embodiment and various modifications and changes can be made within the scope of the gist of the present disclosure described in the scope of claims.

The present disclosure is based on Japanese Patent Application No. 2012-167781 filed on Jul. 27, 2012, the entire specification, scope of claims, and drawings of which are incorporated herein by reference.

REFERENCE SIGNS LIST

1 Category processing system
10 Communication network
101 Exhibitor terminal device
102 Bidder terminal device
200 Search device
200*a* CPU
200*b* ROM
200*c* RAM
200*d* Hard disk
200*e* Media controller
200*f* LAN card
200*g* Video card
200*h* LCD
200*i* Keyboard
200*j* Speaker
200*k* Touch pad
210 Information storage
220 Acquirer
230 Classifier
240 Presenter
250 Counter
260 Searcher
270 Bidder
280 Bid-closer
290 Reclassifier
300 Processing device
300*a* CPU
300*b* ROM
300*c* RAM
300*d* Hard disk
300*e* Media controller
300*f* LAN card
300*g* Video card
300*h* LCD
300*i* Keyboard
300*j* Speaker
300*k* Touch pad
310 Acquirer
320 Identifier
330 Creator

The invention claimed is:

1. A processing device of which processing objects are categories contained in a hierarchical structure comprising categories into which products or services are classified and a keyword, comprising:
   at least one memory operable to store program code;
   at least one processor operable to read the program code and operate as instructed by the program code, the program code including;
   acquisition code configured to acquire, for each category contained in the hierarchical structure, a frequency of a name of the category and the keyword co-occurring in a search query given to a search device;
   identification code configured to identify, when at least a part of a distribution of the acquired frequencies in the hierarchical structure is in conformity with at least one predetermined distribution pattern that is based on a sequence of frequencies within the hierarchical structure, a position in the hierarchical structure of a category of which the name is given by the keyword based on a conformed part of the distribution of the acquired frequencies in the hierarchical structure and the position, in the sequence of frequencies occurring in the distribution pattern, pre-associated with the distribution pattern;
   the identification code further configured to set a category contained in the hierarchical structure as a category of interest, and identify the each of the categories included in the path from the topmost category of the hierarchical structure to the category of interest and the each of the sate immediately below the categories of interest, and if the distribution of the acquired frequencies along the indentified categories is in conformity with the distribution pattern, identify the position on the path that is pre-associated with the distribution pattern as the position of a category of which the name is given by the keyword;
   the identification code further configured to identify an immediately upper category by determining frequency of a first keyword and a second keyword co-occurring in a search query in which they are concatenated by at least one boolean operator;
   creation code configured to create a new category of which the name is given by the keyword at the identified position; and
   classification code to reclassify existing products and services into immediately below categories of the immediately upper category of the new category in the hierarchal structure.

2. The processing device according to claim 1, wherein the at least one distribution pattern has some frequencies that are different with reference to a given comparison criterion relative to other frequencies, and is pre-associated with positions of the different frequencies.

3. The processing device according to claim 1, wherein the at least one distribution pattern has frequencies that are all different from a frequency presenting an absence of co-occurrence with reference to a given comparison criterion, and is pre-associated with a position immediately below the frequency at the end in the sequence of the frequencies.

4. The processing device according to claim 1, wherein given a first search query containing keywords, the search device searches for an object that is matched with all of the keywords,
   the acquisition code is configured to acquire, for each category contained in the hierarchical structure, first frequencies of the name of the category and the keywords co-occurring in the first search query given to the search device, when at least a part of the distribution of the acquired first frequencies in the hierarchical structure is in conformity with a first distribution pattern that is one of the at least one distribution pattern, the identification code is configured to identify the position in the hierarchical structure of a category of which the name is given by the keyword based on the conformed part in the hierarchical structure and the position pre-associated with the first distribution pattern, and the first distribution pattern is a distribution pattern in which some of frequencies, in comparison to other frequencies, are lower with reference to a given comparison criterion, and is pre-associated with the positions of the lower frequencies.

5. The processing device according to claim 1, wherein given a first search query containing keywords, the search device searches for an object that is matched with all of the keywords, the acquisition code is configured to acquire, for each category contained in the hierarchical structure, first frequencies of the name of the category and the keywords co-occurring in the first search query given to the search device, when at least a part of the distribution of the acquired first frequencies in the hierarchical structure is in conformity with a second distribution pattern that is one of the at least one distribution pattern, the identification code is configured to identify the position in the hierarchical structure of a category of which the name is given by the keyword based on the conformed part in the hierarchical structure and the position pre-associated with the second distribution pattern, and the second distribution pattern is a distribution pattern in which frequencies are all higher than a frequency presenting the absence of co-occurrence with reference to a given comparison criterion, and is pre-associated with the position immediately below the frequency at the end in the sequence of the frequencies.

6. The processing device according to claim 1, wherein given a second query containing keywords, the search device searches for an object that is matched with any of the keywords, the, acquisition code is configured to acquire, for each category contained in the hierarchical structure, second frequencies of the name of the category and the keywords co-occurring in the second search query given to the search device, when at least a part of the distribution of the acquired second frequencies in the hierarchical structure is in conformity with a third distribution pattern that is one of the at least one distribution pattern, the identification code is configured to identify the position in the hierarchical structure of a category of which the name is given by the keyword based on the conformed part in the hierarchical structure and the position pre-associated with the third distribution pattern, and the third distribution pattern is a distribution pattern in which some of frequencies, in comparison to other frequencies, are higher with reference to a given comparison criterion, and is pre-associated with the positions of the high frequencies.

7. The processing device according to claim 4, wherein one distribution pattern of the at least one distribution pattern is a second distribution pattern in which frequencies are all higher than a frequency presenting the absence of co-occurrence with reference to a given comparison criterion, and is pre-associated with the position immediately below the frequency at the end in the sequence of the frequencies, and when a first part that is at least a part of the distribution of the acquired frequencies in the hierarchical structure is in conformity with the first distribution pattern and a second part that is at least a part of the distribution of the acquired frequencies in the hierarchical structure is in conformity with the second distribution pattern, the identification code is configured to identify the position in the hierarchical structure of a category of which the name is given by the keyword based on the second part and the position pre-associated with the second distribution pattern.

8. The processing device according to claim 1, wherein the keyword is the category name contained in the hierarchical structure, and the program code further includes:

a determination code configured to determine whether a position in the hierarchical structure of a category of which the name is given by the keyword coincides with the identified position.

9. The processing device according to claim 4, further comprising:

a creation code configured to create a category of which the name is given by the keyword at the identified position.

10. The processing device according to claim 5, further comprising:

a creation code configured to create a category of which the name is given by the keyword at the identified position.

11. The processing device according to claim 6, further comprising:

a creation code configured to create a category of which the name is given by the keyword at the identified position.

12. The processing device according to claim 7, further comprising:

a creation code configured to create a category of which the name is given by the keyword at the identified position.

13. The processing device according to claim 4, wherein the keyword is the name of a category contained in the hierarchical structure, and further comprising:

a determination code configured to determine whether the position in the hierarchical structure of a category of which the name is given by the keyword coincides with the identified position.

14. The processing device according to claim 5, wherein the keyword is the name of a category contained in the hierarchical structure, and further comprising:

a determination code configured to determine whether the position in the hierarchical structure of a category of which the name is given by the keyword coincides with the identified position.

15. The processing device according to claim 6, wherein the keyword is the name of a category contained in the hierarchical structure, and further comprising:

a determination code configured to determine whether the position in the hierarchical structure of a category of which the name is given by the keyword coincides with the identified position.

16. The processing device according to claim 7, wherein the keyword is the name of a category contained in the hierarchical structure, and further comprising:
a determination code configured to determine whether the position in the hierarchical structure of a category of which the name is given by the keyword coincides with the identified position.

17. The processing device of claim 1, wherein
the at least one boolean operator includes at least one from among AND operator (AND co-occurrence frequency), and OR operator (OR co-occurrence frequency).

18. The processing device of claim 17, wherein:
first candidate condition is satisfied if the AND co-occurrence frequency acquired for an immediately lower category is lower than the AND co-occurrence frequencies acquired for the category of interest and categories above the category of interest excluding the topmost one with reference to a given comparison criterion, the distribution of the AND co-occurrence frequencies of the on-the-path categories is in conformity with the given distribution pattern associated with the first candidate condition.

19. The processing device of claim 17, wherein:
first candidate condition is satisfied if the OR co-occurrence frequency acquired for an immediately lower category is lower than the OR co-occurrence frequencies acquired for the category of interest and categories above the category of interest excluding the topmost one with reference to a given comparison criterion, the distribution of the OR co-occurrence frequencies of the on-the-path categories is in conformity with the given distribution pattern associated with the first candidate condition.

20. The processing device of claim 17, wherein:
second candidate condition is satisfied if there is no category immediately below the category of interest and the AND co-occurrence frequencies acquired for the category of interest and the categories above the category of interest excluding the topmost one are higher than a frequency presenting the absence of co-occurrence with reference to a given comparison criterion, the distribution of the AND co-occurrence frequencies of the on-the-path categories is in conformity with the given distribution pattern associated with the second candidate condition.

21. The processing device of claim 17, wherein:
second candidate condition is satisfied if there is no category immediately below the category of interest and the OR co-occurrence frequencies acquired for the category of interest and the categories above the category of interest excluding the topmost one are higher than a frequency presenting the absence of co-occurrence with reference to a given comparison criterion, the distribution of the OR co-occurrence frequencies of the on-the-path categories is in conformity with the given distribution pattern associated with the second candidate condition.

22. A method executed by a processing device of which processing objects are categories contained in a hierarchical structure comprising categories into which products or services are classified and a keyword, comprising:
acquiring for each category contained in the hierarchical structure, a frequency of a name of the category and the keyword co-occurring in a search query given to a search device;
identifying, when at least a part of a distribution of the acquired frequencies in the hierarchical structure is in conformity with one of at least one predetermined distribution pattern that is based on a sequence of frequencies within the hierarchical structure, a position in the hierarchical structure of a category of which the name is given by a keyword based on a conformed part of the distribution of the acquired frequencies in the hierarchical structure and the position, in the sequence of frequencies occurring in the distribution pattern, pre-associated with the distribution pattern;
setting a category contained in the hierarchical structure as a category of interest;
identifying the each of the categories included in the path from the topmost category of the hierarchical structure to the category of interest and the each of the categories immediately below the category of interest, and if the distribution of the acquired frequencies along the identified categories is in conformity with the distribution pattern, identifying the position on the path that is pre-associated with the distribution pattern as the position of a category of which the name is given by the keyword;
identifying an immediately upper category by determining frequency of a first keyword and a second keyword co-occurring in a search query in which they are concatenated by at least one boolean operator;
creating a new category of which the name is given by the keyword at the identified position; and
reclassifying existing products and services into immediately below categories of the immediately upper category of the new category in the hierarchal structure.

23. A computer-readable non-transitory recording medium on which programs are recorded that allow a computer, of which processing objects are categories contained in a hierarchical structure comprising categories into which products or services are classified and a keyword, to:
acquire for each category contained in the hierarchical structure, a frequency of a name of the category and the keyword co-occurring in a search query given to a search device;
identify, when at least a part of a distribution of the acquired frequencies in the hierarchical structure is in conformity with one of at least one predetermined distribution pattern that is based on a sequence of frequencies within the hierarchical structure, a position in the hierarchical structure of a category of which the name is given by the keyword based on a conformed part of the distribution of the acquired frequencies in the hierarchical structure and the position, in the sequence of frequencies occurring in the distribution pattern, pre-associated with the distribution pattern;
set a category contained in the hierarchical structure as a category of interest;
identify the each of the categories included in the path from the topmost category of the hierarchical structure to the category of interest and the each of the categories immediately below the category of interest, and if the distribution of the acquired frequencies along the identified categories is in conformity with the distribution pattern, identify the position on the path that is pre-associated with the distribution pattern as the position of a category of which the name is given by the keyword;
identify an immediately upper category by determining frequency of a first keyword and a second keyword co-occurring in a search query in which they are concatenated by at least one boolean operator;

create a new category of which the name is given by the keyword at the identified position; and
reclassify existing products and services into immediately below categories of the immediately upper category of the new category in the hierarchal structure.

* * * * *